United States Patent
Sakai et al.

(10) Patent No.: US 6,811,923 B1
(45) Date of Patent: Nov. 2, 2004

(54) ACTIVE MATERIAL FOR ANODE OF SECONDARY CELL AND METHOD FOR PRODUCTION THEREOF AND NON-AQUEOUS ELECTROLYTE SECONDARY CELL, AND RECYCLED ELECTRONIC FUNCTIONAL MATERIAL AND METHOD FOR RECYCLING ELECTRONIC FUNCTIONAL MATERIAL

(75) Inventors: Ryo Sakai, Yokohama (JP); Yasuhiro Shirakawa, Yokohama (JP); Kotaro Iyasu, Fuchu (JP); Nobukazu Suzuki, Tokyo (JP); Hisayasu Mitsui, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 227 days.

(21) Appl. No.: 10/018,576

(22) PCT Filed: Jun. 20, 2000

(86) PCT No.: PCT/JP00/04007

§ 371 (c)(1),
(2), (4) Date: Feb. 21, 2002

(87) PCT Pub. No.: WO00/79621

PCT Pub. Date: Dec. 28, 2000

(30) Foreign Application Priority Data

Jun. 21, 1999 (JP) .......................................... 11/174758
Aug. 13, 1999 (JP) .......................................... 11/229162

(51) Int. Cl.⁷ .............................................. H01M 4/48
(52) U.S. Cl. ................... 429/209; 429/218.1; 429/223; 429/224; 429/231.1; 429/231.3

(58) Field of Search .............................. 429/209, 218.1, 429/223, 224, 231.1, 231.3

(56) References Cited

U.S. PATENT DOCUMENTS 5,789,114 A * 8/1998 Adachi et al. ............... 429/232

FOREIGN PATENT DOCUMENTS

| JP | 05-054886 | 3/1993 |
| JP | 08-022846 | 1/1996 |
| JP | 10-008150 | 1/1998 |
| JP | 11-135119 | 5/1999 |
| JP | 11-149925 | 6/1999 |

OTHER PUBLICATIONS

Abstract of JP363195962A, Aug. 15, 1988.*
Abstract of JP409283115A, Oct. 31, 1997.*

* cited by examiner

Primary Examiner—Hoa Van Le
(74) Attorney, Agent, or Firm—Mark R. Shanks

(57) ABSTRACT

Positive electrode active material for nonaqueous electrolytic solution secondary batteries is made of a metal oxide. A content of coarse particles, of which particles sizes are 600% or more with respect to an average particle size of the metal oxide, is 1% or less by volume, and a content of high density particles, of which densities are 150% or more with respect to an average density of the metal oxide, is 1000 ppm or less. By using the positive electrode active material, battery characteristics and a manufacturing yield may be improved.

9 Claims, 14 Drawing Sheets

ACTIVE MATERIAL FOR ANODE OF SECONDARY CELL AND METHOD FOR PRODUCTION THEREOF AND NON-AQUEOUS ELECTROLYTE SECONDARY CELL, AND RECYCLED ELECTRONIC FUNCTIONAL MATERIAL AND METHOD FOR RECYCLING ELECTRONIC FUNCTIONAL MATERIAL

TECHNICAL FIELD

The present invention relates to a positive electrode active material for secondary batteries and a manufacturing method thereof and a nonaqueous electrolytic solution secondary battery, and reproduced electronic functional material and a reproduction method of electronic functional material.

RELATED ART

Recently, portable electronic devices, such as note type personal computers, personal digital assistants (PDAs), cellular phones, video cameras and so on, are rapidly spreading. As they spread, for secondary batteries for use in the portable electronic devices, there are strong demands for smaller size, higher capacity, higher cycle life and so on.

As a secondary battery capable of satisfying such demands, there is known a Li ion secondary battery that utilizes a nonaqueous electrolytic solution including, for instance, a Li salt. In the Li-ion secondary battery, a Li containing transition metal composite oxide, such as $LiCoO_2$, $LiNiO_2$, or $LiMn_2O_4$, is used as the positive electrode active material. For a negative electrode, carbonaceous material is utilized, and a nonaqueous electrolytic solution, in which a lithium salt, such as $LiPF_6$ or $LiBF_4$, is dissolved in a nonaqueous solvent, is utilized.

The Li ion secondary battery has advantages, in comparison with a secondary battery that uses lithium metal, in that safety thereof is remarkably excellent; a voltage a unit cell is high; and a high energy density may be obtained. From these circumstances, the lithium ion secondary batteries are in heavy usage as a power source of the portable electronic device.

The positive electrode active material, such as $LiCoO_2$ or $LiNiO_2$, is normally obtained by sintering a mixture of cobalt oxide or nickel oxide and lithium carbonate in air at a temperature of substantially 900° C. to convert into a composite oxide. The composite oxide obtained through the sintering is milled to a particle diameter of substantially from several micrometers to several tens micrometers, followed by suspending, together with a conductive material and a binder, in an appropriate solvent, thereby slurry is prepared. The slurry is coated on a current collector (metal foil), followed by drying, thereby forming in plate. Thus, a positive electrode is prepared.

However, the lithium ion secondary battery, which uses the existing positive electrode as mentioned above, has a problem in that a voltage drop tends to occur at initial charge, thereby causing a decrease in manufacturing yield and a deterioration of battery performance. Furthermore, as to the decrease in the manufacturing yield, clogging when the positive electrode slurry is coated on the collector and destruction of the collector (metal foil) are also decrease-causing factors.

We studied the aforementioned phenomena and found that powdery metal impurities and agglomerated particles mingled in many cases in the positive electrode active material, which was prepared according to the existing manufacturing method, and these caused problems. Since particles of the metal impurity and the agglomerated particles are only slightly mingled, it is considered that these were overlooked in the existing manufacturing process. Furthermore, sieving is generally used in removing the powdery impurities, but cannot effectively remove particles of the metal impurity and the agglomerated particles, which are small in the difference of particle size from that of particles of original active material.

From these circumstances, in the positive electrode active material for secondary batteries, it is strongly demanded to remove battery performance- and manufacturing yield-deteriorating factors. Furthermore, the impurity particles and agglomerated particles cause problems not only in the ordinary positive electrode active material for secondary batteries, but also in the positive electrode active material, which is physically recovered from waste electrodes and reproduced.

That is, in relation to recent problems of resource starvation and environmental contamination, demands for reproduction of electric appliances are stronger than ever. In electronic functional materials for use in various kinds of electric appliances, in general, expensive metal materials are used. Accordingly, so far, necessity of recovery has been discussed, and recovery and reuse have been actually tried.

In a manufacturing process of secondary batteries, such as lithium ion batteries, due to condition adjustment and cutting into a specified size, there occurs a large amount of waste electrodes, to which the positive electrode active material sticks. From such waste electrodes, Co is recovered and refined by melting; it is once returned to raw material $Co_3O_4$ or the like; thereafter, the positive electrode active material is reproduced by synthesizing again $LiCoO_2$ or the like.

The aforementioned method is called a chemical reproduction because the recovered waste material is chemically returned to raw material before synthesis. In this method, since the electronic functional material being reused has to be re-synthesized from raw material, there is a problem in that reproducing costs are high. Meanwhile, it has been studied to reproduce the electronic functional material without performing separation of the raw material and re-synthesis.

As to the waste electrodes of the secondary batteries, a method for directly recovering the active material, such as $LiCoO_2$ or the like, is proposed (Japanese Laid-Open Patent Application No. 10-8150 JP-A). Specifically, an Al foil (waste electrode), on which the positive electrode material is coated, is heat-treated at a temperature where Al is not melted and $LiCoO_2$ is not decomposed. Thereby, the positive electrode material is separated from the Al foil, and the conductive material and binder are decomposed and removed. Thereby, the positive electrode active material, such as $LiCoO_2$ or the like, may be directly recovered.

In order to discriminate such recovery, reproduction method from the chemical reproduction, which chemically converts to the raw material before the synthesis and recovers, this method is called here a physical reproduction method. The physical reproduction method has advantages over the chemical reproduction method in that processing costs for reproducing the electronic functional material are lower; it is very advantageous from a practical point of view.

As a general physical reproduction process, first, powdery, slurry-like, coating-like electronic functional materials, which are target objects, are recovered from various kinds of electronic components and waste materials of the electronic appliances. When the electronic functional material being reproduced is coating-like, it is peeled from a substrate or the like. Then, large foreign material, such as the substrate, from which the electronic functional material has been peeled off, is separated and removed, further followed by removing the foreign material or impurities, which are capable of removing by washing. As needs arise, heat-treatment, acid- or alkali-treatment is applied to remove removable foreign material and impurities. Furthermore, by applying sieving or drying, without performing the synthesis, reproduced powdery electronic functional material is obtained.

In the physical reproduction, it is necessary that characteristics of the electronic functional material is not deteriorated, even after the various kinds of treatment processes are applied. However, there are problems in that due to mingling of the foreign material, which is actually difficult to separate, fine powder caused by brittleness due to heat in the peeling- or heat-treatment process, mingling of large agglomerations due to residuals of the binder component, characteristics of the reproduced electronic functional material deteriorate. In the physical reproduction of the positive electrode active material for secondary batteries, there is a large possibility of mingling of the impurities, which are difficult to separate by means of the sieving or the like, and furthermore there are a lot of agglomerations of the active material. When the secondary batteries are manufactured by use of such reproduced positive electrode active material, there are problems in that the battery characteristics and the manufacturing yield deteriorate.

From these circumstances, it is desired to heighten utility value of the physical reproduction by suppressing the characteristics deterioration of the electronic functional material (reproduced material) obtained by the physical reproduction. The physical reproduction of the electronic functional material is applied not only to the positive electrode active material of the secondary battery, but also to the reuse of phosphor, which is recovered from phosphor slurry used in manufacturing cathode ray tubes or fluorescent lamps. Also in the physical reproduction of the phosphor, the impurity particles and agglomerated particles are the factors that deteriorate the characteristics and the manufacturing yield of the phosphor.

An object of the present invention is to provide a positive electrode active material for secondary batteries, which allows improving the manufacturing yield of the nonaqueous electrolytic solution secondary batteries and attaining an improvement in the battery characteristics, by removing the factors that deteriorate the battery characteristics and the manufacturing yield, and a manufacturing method thereof, and furthermore a nonaqueous electrolytic solution secondary battery that uses such positive electrode active material. Another object of the present invention is to provide a reproduced electronic functional material, of which characteristics deterioration is suppressed by allowing assuredly and industrially separating/removing foreign materials, impurities, fine powders, coarse agglomerations and so on that mingle during the various kinds of recovery and reproduction processes, and a reproduction method of the electronic functional material.

DISCLOSURE OF THE INVENTION

A positive electrode active material of the present invention for secondary batteries comprises a metal oxide powder for use in nonaqueous electrolyte secondary batteries, in which a content of a coarse particle having a particle diameter of 600% or more relative to an average particle diameter of the metal oxide powder is 1 vol. % or less, and a content of a high density particle having a density of 150% or more relative to an average density of the metal oxide powder is 1000 ppm or less by mass.

A positive electrode active material of the present invention for secondary batteries further comprises 1 vol. % or less of a fine particle having a particle diameter of 15% or less relative to the average particle diameter of the metal oxide powder, and 1000 ppm or less by mass of a low density particle having a density of 50% or less relative to the average density of the metal oxide powder.

Another positive electrode active material of the present invention for secondary batteries comprises a metal oxide powder for use in nonaqueous electrolyte secondary batteries, in which a content of a coarse particle having a particle diameter of 30 $\mu$m or more is 1 vol. % or less, and a content of a high density particle having a density of 7 g/cm$^3$ or more is 1000 ppm or less by mass.

A positive electrode active material of the present invention for secondary batteries further comprises 1 vol. % or less of a fine particle having a particle diameter of 0.5 $\mu$m or less, and 1000 ppm or less by means of a low density particle having a density of 2.5 g/cm$^3$ or less.

A method of manufacturing a positive electrode active material of the present invention or secondary batteries, in manufacturing a powdery positive electrode active material by mixing raw material powders of the positive electrode active material for secondary batteries with a desired ratio and sintering this mixture, by making use of the difference of resistance force due to the particle diameter or the density of the particle constituting the powdery positive electrode active material, the simultaneously separating and removing a coarse particle and a high density article from the powdery positive electrode active material is implemented so that the course particle having a particle diameter of 250% or more relative to an average particle diameter of powdery positive electrode active material and the high density particle having a density of 120% or more relative to an average density of the powdery positive electrode active material, may be simultaneously removed.

In a method of manufacturing a positive electrode active material for secondary batteries of the present invention, a separating and removing process is implemented, for instance, so that a coarser particle having a particle diameter of 250% or more relative to an average particle diameter of powdery positive electrode active material, and a high density particle having a density of 120% or more relative to an average density of the powdery positive electrode active material, maybe simultaneously removed. Furthermore, the separating and removing process is implemented by use of, for instance, a classifier.

A manufacturing method of the present invention of positive electrode active material is implemented, for instance, so that a fine particle having a particle diameter of 50% or less relative to the average particle diameter of the, powdery positive electrode active material, and a low density particle having a density of 75% or less relative to the average density of the powdery positive electrode active material, may be simultaneously removed from the powdery positive electrode active material.

A nonaqueous electrolyte secondary battery of the present invention comprises a positive electrode, which includes a positive electrode active material consisting essentially of a Li containing composite metal oxide power and of which content of a coarse particle having a particle diameter of 600% or more relative to an average particle diameter of the composite metal oxide powder is 1 vol. % or less, and of which content of a high density particle having a density of 150% or more relative to an average density of the composite metal oxide powder is 1000 ppm or less by mass: a negative electrode disposed so as to face, through a separator, the positive electrode: a battery case, which accommodates the positive electrode, the separator, and the negative electrode: and a nonaqueous electrolytic solution filled in the battery case.

Another nonaqueous electrolytic solution secondary battery of the present invention comprises a positive electrode, which includes a positive electrode active material consisting essentially of a Li containing composite metal oxide powder and of which content of a coarser particle having a particle diameter of 30 µm or more is 1 vol. % or less, and of which content of a high density particle having a density of 7 g/cm$^3$ or more is 1000 ppm or less by mass: a negative electrode disposed so as to face, through a separator, the positive electrode: a battery case, which accommodates the positive electrode, the separator, and the negative electrode: and a nonaqueous electrolytic solution filled in the battery case.

As mentioned above, there are mingled powdery metal impurities and agglomerated particles in the positive electrode active material for secondary batteries, and these may cause problems. In particular, higher density particles, such as powdery metal impurities large in particle size, elute due to a high positive electrode potential at the initial charge of the secondary battery, and eluted metal ions are reduced at the negative electrode side and precipitate there. Thereby, a micro-short circuit may be caused. In addition, the coarser particles, such as the agglomerated particles, may remain between a coating bed and a substrate at the coating of the positive electrode, or may cause destruction in a metal foil, a current collector. Furthermore, the finer particles and the lower density particles may be factors that deteriorate the battery characteristics.

As a method for removing the coarser and finer particles, the sieving (wet or dry method) is generally used. However, since the positive electrode active material has a small particle size in the range of from several micrometers to several tens micrometers, the dry sieving immediately causes the clogging of the sieve. Accordingly, the dry sieving method is substantially impossible to put into practical use. While, according to the wet sieving, the clogging problem may be solved, since the particle size difference between the coarser particles, such as the agglomerated particles, and the original positive electrode active material is small, an ordinary wet sieving may not allow obtaining sufficient separation accuracy. In addition, the sieving may not remove powdery metal impurities or the like.

In the present invention, by making use of the difference of resistance force due to the sizes and the densities of the particles constituting the positive electrode active material for secondary batteries, the coarser particles and the higher density particles are simultaneously separated and removed from the positive electrode active material. This separating/removing process may further allow separating/removing the finer particles and the lower density particles. That is, resistance force of the particle against physical force, such as gravitational force, inertial force, centrifugal force and so on of the particle differs due to the particle size and the density thereof. Accordingly, by making use of the difference of such resistance force, the coarser particles and the higher density particles, and furthermore the finer particles and the lower density particles, may be easily separated and removed with accuracy.

The aforementioned separating/removing process may be implemented by use of various kinds of classifiers. For instance, in a dry centrifugal classifier, classification points may be set finely divided based on the particle size and the density of the particle. Accordingly, even the coarser particles, such as the agglomerated particles, which is small in the particle size difference from the positive electrode active material for secondary batteries, and the higher density particles, such as the powdery metal impurities may be separated and removed with high accuracy. Furthermore, the finer particles and the lower density particles may be similarly separated/removed with high accuracy.

By carrying out the aforementioned separating/removing process, the positive electrode active material for secondary batteries, of which contents of the coarser particles and the higher density particles are simultaneously reduced, may be obtained with high reproducibility. By use of such positive electrode active material for secondary batteries, the micro-short circuit of the secondary battery due to such higher density particles and coating failure during positive electrode manufacture due to the coarser particles may be suppressed from occurring. Accordingly, the secondary batteries excellent in the battery characteristics and high in the manufacturing yield may be provided.

Furthermore, even when the electronic functional material is reproduced by means of the physical reproduction, the foreign material, impurities, the coarser particles, such as the agglomerated particles, or the higher density particles mingle during the recovering and reproducing process. These cause the deterioration of the characteristics of the reproduced electronic functional material. Even for the removal of such coarser particles and the higher density particles, and in addition, the finer particles and the lower density particles, which mingle in the reproduced electronic functional material, the aforementioned separation and removing process, which make use of the difference of the resistance force due to the particle sizes and the densities of the particles, may be effective. In the reproduced electronic functional material of the present invention and the reproduction method of the present invention of the electronic functional material, such separating and removing process is applied.

That is, the reproduced electronic functional material of the present invention is the reproduced powdery electronic functional material recovered and reproduced from waste electronic components or waste material produced in the manufacturing process of the electronic components; the reproduced powdery electronic functional material contains 1% or less by volume of coarser particles, of which particle sizes are 600% or more with respect to an average particle size of the powder, and 1000 ppm or less by mass of higher density particles, of which densities are 150% or more with respect to an average density of the powder.

The reproduced electronic functional material of the present invention includes 1% or less by volume of finer particles, of which particle sizes are 15% or less with respect to the average particle size of the powder, and 1000 ppm or less by mass of lower density particles, of which densities are 50% or less with respect to the average density of the powder.

Another reproduced electronic functional material of the present invention is reproduced powdery electronic functional material recovered and reproduced from waste electronic components or waste material produced in the manufacturing process of the electronic components; the reproduced powdery electronic functional material contains 1% or less by volume of finer particles, of which particle sizes are 15% or less with respect to the average particle size of the powder, and 1000 ppm or less by mass of lower density particles, of which densities are 50% or less with respect to the average density of the powder.

A reproducing method of electronic functional material of the present invention includes recovering the electronic functional material from waste electronic components or waste material produced in the course of manufacturing the electronic components; and reproducing the powdery electronic functional material by refining the recovered electronic functional material; wherein in the course of refining the recovered electronic functional material, by making use of the difference of the resistance force due to the particle sizes and the densities of the particles constituting the powdery electronic functional material, the simultaneously separating and removing the coarser particles and the higher density particles from the powdery electronic functional material is implemented so that the coarser particles, of which particle sizes are 250% or more with respect to an average particle size of powdery electronic functional material, and higher density particles, of which densities are 120% or more with respect to an average density of the powdery electronic functional material may be simultaneously removed.

In the reproduction method of the electronic functional material of the present invention, the separating/removing process is performed, for instance, so that the coarser particles, of which particle sizes are 250% or more with respect to an average particle size of powdery electronic functional material, and higher density particles, of which densities are 120% or more with respect to an average density of the powdery electronic functional material may be simultaneously removed. Furthermore, the separating/removing process may be performed by means of, for instance, the classifier.

In the reproduction method of the present invention of the electronic functional material, the separating/removing process is performed further so that the finer particles, of which particle sizes are 50% or less with respect to an average particle size of the powdery electronic functional material, and the lower density particles of which densities are 75% or less with respect to an average density of the powdery electronic functional material may be simultaneously removed from the powdery electronic functional material.

Another reproducing method of the present invention of electronic functional material includes recovering the electronic functional material from waste electronic components or waste material produced in the course of manufacture of the electronic components: and reproducing the powdery electronic functional material, the coarser particles and the higher density particles are simultaneously separated and removed from the powdery electronic functional material.

EMBODIMENTS

Figure 1:
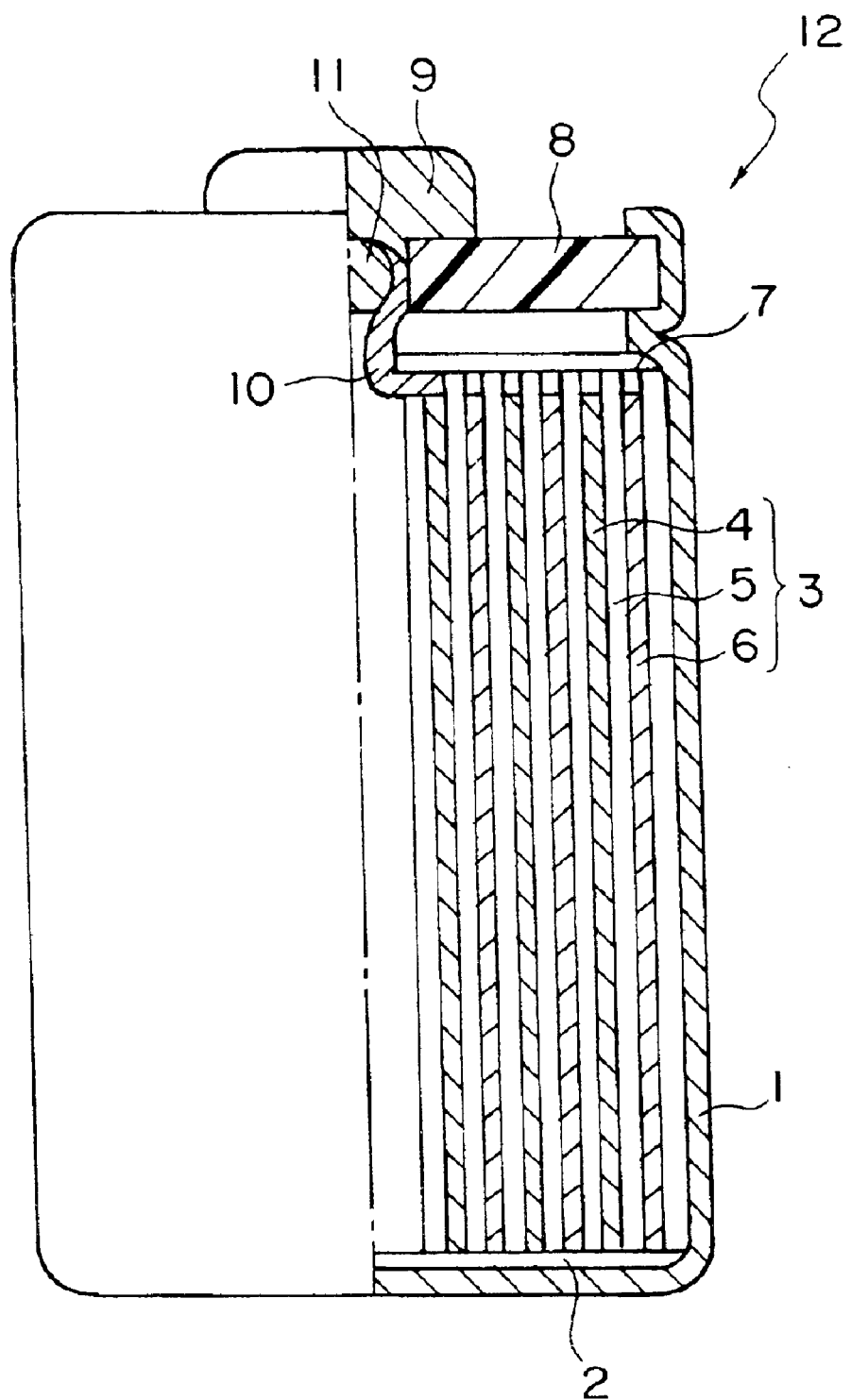
FIG. 1 is a sectional view showing an example of configuration of a nonaqueous electrolytic solution secondary battery, to which positive electrode active material for secondary batteries of the present invention is applied.

In the following, modes for implementing the present invention will be explained.

First, positive electrode active material of the present invention for secondary batteries and a manufacturing method thereof, and furthermore an implementation mode of a nonaqueous electrolytic solution secondary battery therewith will be described.

The positive electrode active material of the present invention for secondary batteries is used for a positive electrode of a nonaqueous electrolytic solution secondary battery, such as a lithium ion secondary battery. For such positive electrode active material, a metal oxide, such as, for instance, a composite metal oxide containing lithium, is used. As the lithium containing composite metal oxide, lithium-cobalt composite oxide, lithium-nickel composite oxide, lithium-manganese composite oxide and so on may be cited.

Though the lithium cobalt composite oxide and lithium-nickel composite oxide are basically expressed by $LiMo_2$ (M denotes at least one kind of element selected from Co and Ni), a ratio of Li to Co or Ni may deviate from a stoichiometric composition to a little Li-rich side (for instance, Li/M ratio=1 to 1.2). Co or Ni may be partially replaced by a transition metal element, such as Sn, Al, V, Cr, Fe, Mn or the like.

Though the lithium manganese composite oxide is basically expressed by $LiMn_2O_4$, a ratio of Li to Mn may a little deviate from a stoichiometric composition. In that case, Li-rich side (for instance, Li/Mn ratio=0.5 to 0.65) is preferably used. Mn may be partially replaced by a transition metal element, such as Sn, Al, V, Cr, Fe, Co, Ni or the like.

In the present invention, both coarser particles and higher density particles are removed from the positive electrode active material, made of the metal oxide as mentioned above. That is, the positive electrode active material of the present invention for secondary batteries contains 1% or less by volume of the coarser particles, of which particle sizes are 600% or more with respect to an average particle size of the metal oxide constituting it, and 1000 ppm or less by mass of higher density particles, of which densities are 150% or more with respect to an average density of the metal oxide. These coarser particles and the higher density particles may be simultaneously removed by a separating process that makes use of the difference of the resistance force due to particle size and density of the particle, described below, specifically the classification.

Specifically, the coarser particles are preferably stipulated for the content of the coarser particles, of which particle sizes are 30 μm or more, to be 1% or less by volume. Furthermore, the higher density particles are preferably stipulated for the content of the higher density particles, of which densities are 7 g/cm³ or more, to be 1000 ppm or less by mass. Such coarser particles and the higher density particles, as shown in the following, adversely affect on the characteristics and manufacturability of the nonaqueous electrolytic solution secondary batteries. Accordingly, the present invention aims reducing the contents thereof.

The positive electrode of the nonaqueous electrolytic solution secondary battery is ordinarily manufactured in the following ways. That is, the composite metal oxide or the like, as the positive electrode active material, is prepared by sintering method, and, as needs arise, followed by milling to obtain powder. The positive electrode active material is synthesized by mixing, for instance, cobalt oxide and lithium carbonate with a predetermined ratio, followed by sintering in air under the conditions such as 900° C.×5 hr. The sintered body is milled to particle size of from several micrometers to several tens micrometers. Thereafter, this is suspended in an appropriate solvent together with the conductive material and the binder; the suspension is coated on the current collector and dried to be sheet-like, thereby preparing the positive electrode.

When there are the coarser particles or the higher density particles mingled in the aforementioned powdery positive electrode active material, various kinds of problems may be caused. The coarser particles and the higher density particles may become the factors that make the manufacturing yield of the batteries lower and deteriorate the battery characteristics (battery capacity and charge-discharge characteristics). In the present invention, as the coarser particles to be removed, the agglomerations (secondary particles) of the positive electrode active material, combined bodies (agglomerations) of the positive electrode active material and the binder, or foreign materials (impurity particles) are cited. Furthermore, as the higher density particles, the powdery metal impurities may be cited.

The metallic impurities contain metals or metal ions other than the metal oxide necessary for configuring the positive electrode active material. These metallic impurities come into the positive electrode material from various reasons. The metallic impurities may be contained, for instance, in the metal oxide, which is raw material of the positive electrode active material, or may come in by biting away an apparatus wall surface when the active material comes into contact with a manufacturing apparatus, in the milling process of the sintered body or in the mixing process of the positive electrode material. Such metallic impurities frequently contain metals, such as iron, copper, nickel, zinc or the like, and alloys containing the same.

Among the aforementioned metallic impurities, the powdery metallic impurities, which have a particularly large particle size, cause the voltage drop failure at the initial charge of the nonaqueous electrolytic solution secondary battery. That is, when there are the powdery metallic impurities mingled in the positive electrode active material, at the initial charge of the secondary battery, the metals in the powdery impurities are eluted as ions due to a high positive electrode potential. The eluted metals are reduced at the negative electrode side and precipitate and pile up on the negative electrode. When the piling up of the metal ion proceeds, the metal ions penetrate through the separator to come into contact with the positive electrode, thereby causing the micro-short circuit.

Such phenomena may become conspicuous as the particle size of the metallic impurity becomes larger. The surface of the metallic impurities is ordinarily oxidized. However, the larger particles contain relatively large number of the metal ions in an un-oxidized inside thereof. Accordingly, since the eluting metal ions are many in the relatively large impurity particle, the micro-short circuit tends to be easily caused.

Furthermore, when the impurity particles, which are large in their particle sizes, are present on the surface of the positive electrode or the negative electrode, at the charge, there occurs an intercalation of the lithium ions into the negative electrode active material, and the negative electrode bulges. Due to this, pressure is applied on an electrode group; the impurity particles penetrate through the separator; thereby, the micro-short circuit is caused.

As mentioned above, the powdery metallic impurities may cause the voltage drop failure at the initial charge. From these circumstances, in the present invention, the content of the higher density particles, which correspond to the powdery metallic impurities, is set at 1000 ppm or less by mass. Thus, according to the positive electrode active material, in which the content of the higher density particles is reduced, the micro-short circuit of the secondary battery due to the metallic impurities may be suppressed. Accordingly, the battery characteristics and the manufacturing yield may be improved. Since the powdery metallic impurities partially correspond to the coarser particles too, the reduction of the content of the coarser particles also contributes in an improvement in the battery characteristics and the manufacturing yield.

The higher density particles, of which content in the positive electrode active material for secondary batteries is stipulated, are the particles, of which densities are 150% or more with respect to the average density of the metal oxide constituting the positive electrode active material. Specifically, it is preferable to stipulate the content of the particles of which densities are 7 g/cm³ or more. Since such higher density particles tend to cause the aforementioned micro-short circuit, the content is stipulated at 1000 ppm or less by mass. The content of the higher density particles is preferably stipulated at 500 ppm or less, and further preferably at 100 ppm or less. The more preferable content of the higher density particles is 10 ppm or less.

As mentioned above, the higher density particles are substantially made of the metallic impurities. Target metallic impurities include the metals or the metal ions other than the metal oxide necessary for configuring the positive electrode active material. However, the metallic impurities containing, in particular, the metals, which tend to be the impurity ions, are preferably removed. In case, for instance, lithium-cobalt composite oxide is used as the positive electrode active material, it is preferable to reduce the content of iron, copper, zinc, nickel, manganese, or the like.

When the aforementioned impurity metals are contained much, since an amount of the metallic impurities increases in proportion thereto, it is also preferable to reduce a total content of individual impurity metals. Specifically, iron is preferably contained 200 ppm or less; copper, 50 ppm or less; zinc, 30 ppm or less; nickel, 400 ppm or less; and manganese, 40 ppm or less. By setting the metal contents as the impurities in the aforementioned range, for instance, the voltage drop failure at the initial charge may be more effectively suppressed. The iron as the impurity element is further preferably contained 100 ppm or less; copper, 25 ppm or less; zinc, 20 ppm or less; nickel, 100 ppm or less; and manganese, 20 ppm or less.

Meanwhile, the coarser particles, of which particle sizes are 600% or more with respect to the average particle size of the metal oxide constituting the positive electrode active material, may cause process failure, in particular at the manufacture of the positive electrode. That is, accompanying a recent tendency towards thinner and higher power secondary batteries, a thickness of the positive electrode (coating thickness) is getting thinner. Accordingly, in case there are the coarser particles in the positive electrode active material, it may occur that the coarser particles may reside between the coating bed and the substrate in the course of coating at the manufacture of the positive electrode, or the metal foil, the current collector, may be destroyed. Furthermore, a surface of the electrode becomes rough, and thereby a capacity a unit volume of the secondary battery may be lowered.

Accordingly, in the present invention, the content of the coarser particles is set at 1% or less by volume. According to such positive electrode active material, since the process failure may be suppressed from occurring in the course of coating at the manufacture of the positive electrode, the manufacturing yield of the secondary batteries may be improved.

The coarser particles, of which content in the positive electrode active material for secondary batteries is stipulated, are the particles, of which particle sizes are 600% or more with respect to the average particle size of the metal oxide constituting the positive electrode active material. Specifically, it is desirable to stipulate the content of the particles, of which particle sizes are 30 μm or more. Since such coarser particles may cause failure in the course of coating, the content thereof is stipulated at 1% or less by volume. The content of the aforementioned coarser particles is more preferably set at 0.5% or less. Furthermore, it is preferable to set the content of the particles, of which particle sizes are 400% or more with respect to the average particle size of the metal oxide, or the content of the particles, of which particle sizes are 20 μm or more, at 1% or less by volume.

The positive electrode active material of the present invention for secondary batteries is one in that both the aforementioned coarser particles and higher density particles are simultaneously removed. Thus, by simultaneously removing the coarser particles and the higher density particles, which may cause lowering of the battery yield and deterioration of the battery characteristics (battery capacity and charge-discharge characteristics), from the positive electrode active material, the manufacturing failure or the initial failure of the nonaqueous electrolytic solution secondary batteries may be largely reduced, and the battery characteristics may be improved. Removal of only one of the coarser particles and the higher density particles may cause lowering of the manufacturing yield due to the particles escaped from the removal.

Furthermore, the positive electrode active material of the present invention for secondary batteries, in addition to the stipulation on the particle sizes of the aforementioned coarser particles and the higher density particles, is preferably stipulated to contain 1% or less by volume of the finer particles, of which particle sizes are 15% or less with respect to the average particle size of the metal oxide constituting the positive electrode active material, and 1000 ppm or less by mass of the lower density particles, of which densities are 50% or less with respect to the average density of the metal oxide.

That is, since the finer particle is small in the battery capacity, when there are too many thereof, the capacity per unit mass may be caused to become lower. Furthermore, since, even at the same capacity, the density in the coating becomes smaller, the density per unit volume of the secondary battery becomes smaller. The lower density particles cause the lowering of the battery capacity. From these circumstances, by reducing a ratio of the finer particles and lower density particles in the positive electrode active material, the characteristics of the nonaqueous electrolytic solution secondary battery may be furthermore improved.

In the finer particles, of which content in the positive electrode active material for secondary batteries is stipulated, it is preferable to stipulate a content of particles, of which particle sizes are 15% or less with respect to the average particle size of the metal oxide constituting the positive electrode active material, specifically, the particles, of which particle sizes are 0.5 μm or less. Since such finer particles may cause lowering of the battery capacity, by reducing the content thereof to 1% or less by volume, the performance of the secondary battery may be improved. Furthermore, it is preferable to set the content of the finer particles, of which particle sizes are 20% or less with respect to the average particle size of the metal oxide, or the content of the particles, of which particle sizes are 0.8 Sa or less, at 1% or less by volume.

In the lower density particles, of which content in the positive electrode active material for secondary batteries is stipulated, it is preferable to stipulate a content of the particles, of which density is 50% or less with respect to the average particle size of the metal oxide constituting the positive electrode active material, specifically, the particles, of which densities are 2.5 g/cm³ or less. Since such lower density particles may cause lowering of the battery capacity, by reducing the content thereof to 1000 ppm or less by mass, the performance of the secondary battery may be improved. The content of the lower density particles is preferable to be 500 ppm or less by mass, furthermore preferable to be 100 ppm or less. Furthermore, it is preferable to set the content of the particles, of which densities are 70% or less with respect to the average density of the metal oxide, or the content of the particles, of which densities are 3.5 g/cm$^3$ or less, at 1000 ppm or less by mass, and furthermore at 100 ppm or less.

The particle size of the positive electrode active material in the present invention is stipulated in the following ways. That is, the particle size distribution of the present positive electrode active material is measured by means of MICROTRACK II PARTICLE SIZE ANALYZER (manufactured by LEEDS & NORTHRUP INSTRUMENTS). This utilizes, as a measuring principle, an optical scattering phenomenon occurring when laser light is irradiated on particles. The particle size is stipulated based on the particle size distribution. However, the coarser particles present in an extremely slight amount, sometimes, may not be judged of its content on the particle size distribution. In such case, after the coarser particles and the higher density particles are separated/removed, the classification is performed again. Thereby, it may be confirmed based on the particles separated on the coarser particle side at that time. Furthermore, also by observing the positive electrode active material by use of a scanning electron microscope, the contents of the coarser particles and finer particles may be confirmed.

Furthermore, an amount of the higher density particles, substantially made of the metallic impurities, may be confirmed by treating with a weak acid capable of dissolving only the metallic impurities, followed by measuring the metal component contained in a solution after the treatment. That is, the Li containing composite metal oxide is not dissolved in a weak acid, such as oxalic acid or the like, but the metallic impurities are dissolved in oxalic acid. Accordingly, by treating the positive electrode active material with the weak acid, such as oxalic acid or the like, and by measuring contents of iron, copper, zinc, nickel, and manganese in a solution after the treatment, a mass ratio of the metallic impurity particles as the higher density particles in the positive electrode active material may be confirmed. A total content of the aforementioned impurity metals is obtained by performing a total analysis of the impurities contained in the positive electrode active material.

The aforementioned positive electrode active material of the present invention is manufactured in the following ways.

First, according to the ordinary sintering method, a Li containing composite metal oxide, such as $LiCoO_2$, $LiNiO_2$, or $LiMn_2O_4$ is synthesized. The Li containing composite metal oxide is obtained by mixing a lithium compound and a compound of cobalt, nickel, manganese or the like as raw materials with a predetermined ratio, followed by sintering the mixture, for instance, in air at a temperature of from 650 to 950° C. For the compounds as the raw materials, oxide, carbonate, sulfate, nitrate, hydroxide or the like may be used. It is preferable to use ones that contain less the metallic impurities. Furthermore, preceding the sintering, refining for removing the metallic impurities may be applied.

The Li containing composite metal oxide obtained by the synthesis process is milled by use of a crusher, such as a ball mill, cutter mill, hammer mill, jet mill or the like, so that the average particle size may be from 0.5 to 15 μm, more preferably from 1 to 10 μm. At this time, in order for the powdery metallic impurities not to increase in their amounts, a surface of the apparatus, with which the active material may come into contact, may be effectively coated by ceramics or the like.

In the powdery positive electrode active material thus obtained, the higher density particles, such as the powdery metallic impurities that come from the raw material and the powdery metallic impurities introduced in the manufacturing process, or the coarser particles, such as the agglomerations (secondary particles) of the positive electrode active material, the agglomerations of the positive electrode active material and the binder, the impurity particles or the like, are contained. Furthermore, the finer particles and the lower density particles are frequently contained.

Accordingly, to the obtained powdery positive electrode active material, by making use of the resistance due to the particle size and the density thereof, the process for separating/removing the coarser particles and the higher density particles is applied. By this separating process, the coarser particles and the higher density particles, and furthermore the finer particles and the lower density particles are separated/removed, thereby the positive electrode active material of excellent quality may be obtained. The separating/removing process is preferably performed so that a D (90) value (a particle size when a cumulative volume of the particles in a particle size distribution reaches 90%) may become smaller for the coarser particles, and a D (10) value (a particle size when a cumulative volume of the particles in a particle size distribution reaches 10%) may become larger for the finer particles.

The aforementioned separating/removing process makes use of the resistance force of the particle against physical force, such as gravitational force, inertial force, centrifugal force and so on, being different due to the particle size and the density thereof. Specifically, by making use of various kinds of classifier, such as a gravitational classifier, inertial classifiers, centrifugal classifier or the like, the coarser particles and the higher density particles, or the finer particles and the lower density particles are separated/removed. The removing operation of these individual particles may be simultaneously performed. For the classifier, in view of suppressing composition variation and agglomeration, and furthermore easiness of later process, a dry type is preferably used. That is, it is preferable to use the dry classifier that may remove the coarser particles and the higher density particles without changing a state of the positive electrode active material.

As the dry classifier, various kinds, such as the aforementioned gravitational type, inertial type, centrifugal type and so on are known. The gravitational type classifier performs classification due to the difference of falling speed or position of the particle. As the typical type, horizontal flow type, vertical flow type, zigzag type, zigzag flow type or the like is known. The inertial type classifier performs classification by making use of the inertial force of the particle, and a linear classifier, louver classifier, Elbow-Jet classifier, variable impactor or the like is known.

The centrifugal force type classifier performs classification by making use of a balance between centrifugal force due to free vortex, semi-free vortex, or centrifugal force due to forced vortex, and fluid resistance, and as the typical type, cyclone air-separator, vantongeren, Classiclone, Dispersion Separator, Microplex Classifier, Micro-Separator, Micron Separator, Turboplex, Acucut, Turbo Classifier and so on are known.

In the present invention, the process for separating/removing the coarser particles and the higher density particles is effectively performed by making use of the aforementioned classifier. That is, as the method for removing the coarser particles and the finer particles, the sieving (wet type or dry type) is generally used. However, since the particle size of the positive electrode active material is small such as from several micrometers to several tens micrometers, the clogging occurs soon in the dry sieving; it is impossible to industrially put into practical use. The dry sieving soon causes the clogging when the particles in the order of 100 μm or less are sieved.

On the other hand, the wet sieving may allow overcoming the problem of the clogging. However, since, in addition to the particle size of the positive electrode active material being small such as from several micrometers to several tens micrometers, the particle size difference between the coarser particles, such as the mingled agglomerations, and the original active material particles is small, sufficient separation accuracy may not be obtained by the ordinary wet sieving. Furthermore, the wet sieving may not remove the powdery metallic impurities, of which particle size is only slightly different from that of the active material. Since in the wet sieving, slurry is passed, in order to finally obtain powdery reproduced material, a drying process is necessary. However, it is difficult to dry without allowing agglomerating. In addition, in the wet sieving, when preparing in slurry, there is concern of deterioration of the battery characteristics due to elution of lithium from the active material, change of a surface state of the active material, and others.

On the other hand, use of an iron remover is considered to remove the metallic impurities. The iron remover removes magnetic substances by use of a rare earth magnet or the like. Accordingly, non-magnetic nickel and zinc may not be removed. Furthermore, the iron remover is less efficient in removing the metallic impurities.

Contrary to the aforementioned existing impurity removing process, according to the separating process that uses the classifier, the coarser particles and the higher density particles, furthermore the finer particles and the lower density particles may be easily and accurately separated/removed from the positive electrode active material. The coarser particles and the higher density particles may be simultaneously separated/removed. This is important in view of improving the characteristics of the secondary battery and the manufacturing yield thereof. The situations are the same with finer particles and the lower density particles.

That is, the particle size of the coarser particle, which causes problems in the manufacturing process, is substantially 250% or more in comparison with that of the particle of the ordinary active material, and the density of the metallic impurities is substantially from 7 to 9 g/cm$^3$ in comparison with the density of the positive electrode active material of substantially 5 g/cm$^3$. Both the differences are sufficient values for implementing the separation by means of the classifier. For instance, in the dry type classifier due to the centrifugal force method, the classification points may be set fine based on the radius and density of the particle. Accordingly, the coarser particles, such as agglomerations, and the powdery metallic impurities, of which particle size difference is small, may be simultaneously and accurately separated/removed. The situations are similar with the finer particles and the lower density particles.

In the present invention, the aforementioned various classifiers may be used to simultaneously separate/remove the coarser particles and the higher density particles, and furthermore the finer particles and the lower density particles. The separation/removal of the finer particles and the lower density particles may be implemented simultaneously with the separation/removal of the coarser particles and the higher density particles through condition setting of the classifier. In the present invention, it is preferable to use the classifier that may satisfy, in particular, the conditions (1) high in dispersion properties, (2) high in classification accuracy, and (3) less in crushing the particles (small in damage).

As to (1), since the positive electrode active material is substantially made of the particles of 20 μm or less, that is, of smaller particles, agglomerating tendency is high. Accordingly, without applying strong dispersion, the classification may not be implemented based on the sizes of the primary particles, thereby affecting on the classification accuracy. As to (2), it is preferable that there are no mingled coarser articles, higher density particles, finer particles, and lower density particles that affect on the battery characteristics. Only a slight amount of these may cause fatal defects such as short circuit of the battery or the like. As to (3), though relating with (1), when the dispersion is too strong, the primary particles may be crushed to produce finer particles, thus resulting in the lowering of the yield and the deterioration of the battery characteristics. Furthermore, even when the particles are not crushed, strong force applied on the particles may cause distortion in crystal grains, and the battery characteristics may be deteriorated.

From these circumstances, in the present invention, the classifier capable of satisfying all of the aforementioned conditions (1) through (3) is preferably employed. As the classifier satisfying the aforementioned conditions, in the present invention, a dry centrifugal classifier may be preferably used. In particular, the classifier that makes use of the difference of fluid resistance against centrifugal force, and is high in dispersion properties and capable of precision classification, is preferably used.

The separating/removing process, which makes use of the aforementioned classifier, is preferably implemented by setting the classification conditions so that the coarser particles, of which particle sizes are 250% or more with respect to the average particle size of the powdery positive electrode active material, and the higher density particles, of which densities are 120% or more with respect to the average density, may be removed. Specifically, the classification point that may remove the aforementioned coarser particles and the higher density particles is preferably set. From a point of view of removing the powdery metallic impurities, the classification point may be preferably set at 15 μm or less.

Figure 2:
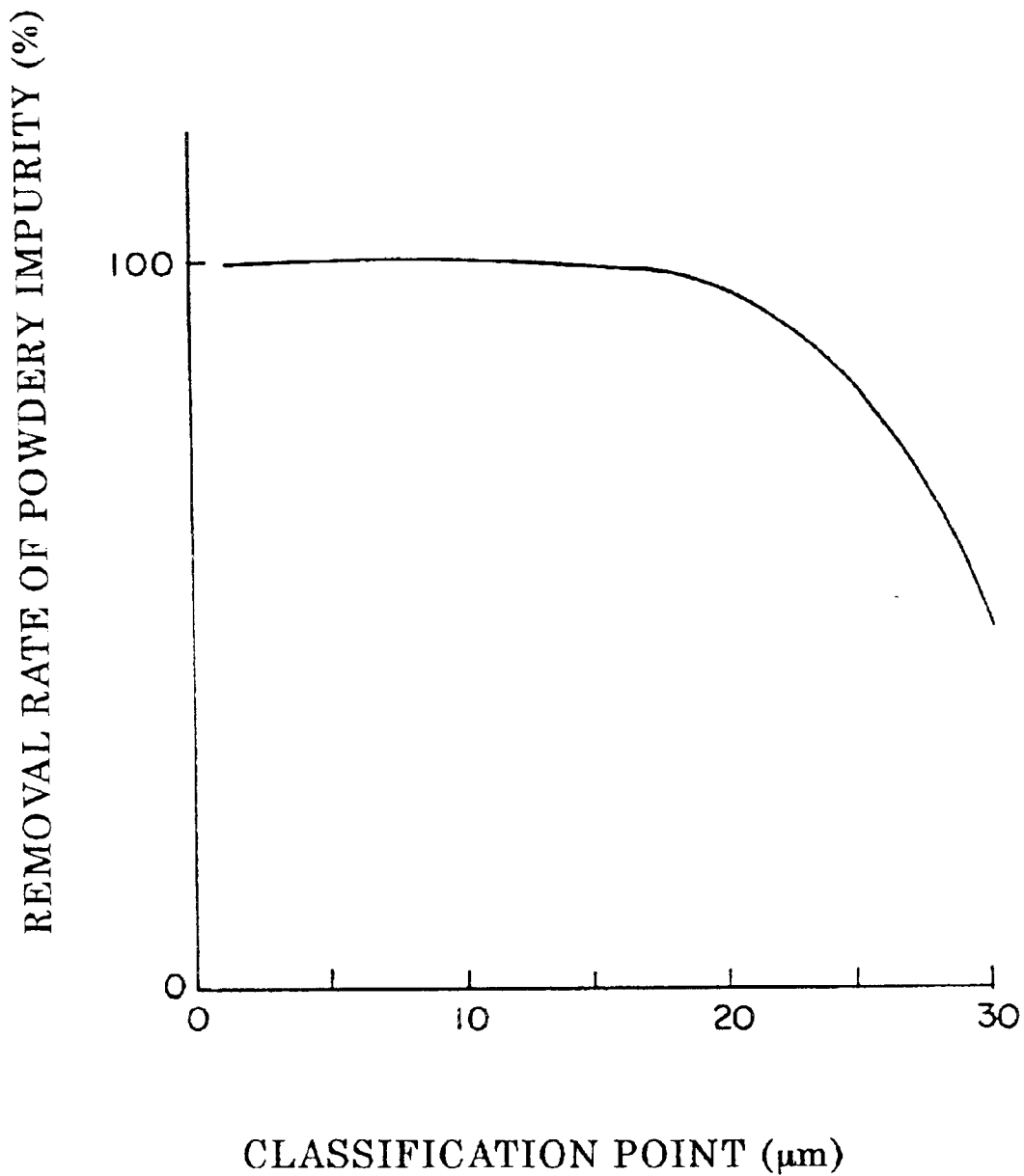
FIG. 2 is a diagram showing one example showing relationship between classification point of a dry classifier and removal rate of powdery metal impurities.

FIG. 2 shows one example of removal rate of the powdery metallic impurities, when the classification point is altered by adjusting a revolution number of a classifier rotor (centrifugal force) and an airflow rate (air resistance force). Substantially 100% of the powdery metallic impurities may be removed when the classification point is set at 15 μm or less. However, when it exceeds that value, the removal rate decreases. This is considered because the particle sizes of the powdery metallic impurities are substantially 15 μm or more. Accordingly, the powdery metallic impurities may be sufficiently removed by setting the classification point at 15 μm or less, thereby the voltage drop of the secondary battery at the initial charge may be remarkably suppressed.

Furthermore, as to the finer particles and the lower density particles, the classification point is preferably set so that the finer particles, of which particle sizes are 50% or less with respect to the average particle size of the powdery positive electrode active material, and the lower density particles, of which densities are 75% or less with respect to the average density, may be removed. The finer particles and the lower density particles may be separated/removed simultaneously with the coarser particles and the higher density particles in the same operation.

In the manufacturing method of the positive electrode active material of the present invention, the classification conditions are set based on the average particle size and the average density of the active material powder before the classification. However, since the content of the particles to be removed is usually slight, the aforementioned average particle size and the average density are substantially the same as the average particle size and the average density of a target positive electrode active material powder.

The positive electrode active material for secondary batteries, which is obtained through the aforementioned separating/removing process (classification process), may satisfy the conditions in that the content of the coarser particles, of which particle sizes are 600% or more with respect to the average particle size, is 1% or less by volume, and the content of the higher density particles, of which densities are 150% or more with respect to the average density, is 1000 ppm or less by mass. Furthermore, the conditions in that the content of the finer particles, of which particle sizes are 15% or less with respect to the average particle size, is 1% or less by volume, and the content of the lower density particles, of which densities are 50% or less with respect to the average density, is 1000 ppm or less by mass are satisfied. In the present invention, it is desirable for all the conditions of the content of the coarser particles and the content of the higher density particles, and the content of the finer particles and the content of the lower density particles are satisfied.

The positive electrode active material for secondary batteries, which is obtained through the separating/removing process (classification process), is mixed with the conductive material, followed by further adding the binder and the solvent, thereby obtaining slurry. The slurry is coated on the current collector (metal foil or the like), followed by heating and drying into a sheet, further followed by cutting into a predetermined dimension, thereby obtaining a positive electrode. The classification process may be performed after the positive electrode active material is mixed with the conductive material. In case the classification is performed after the positive electrode active material is mixed with the conductive material, the impurity particles and the coarser particles in the conductive material also may be removed. However, in case such process is applied, the conductive material may be partially removed in the lower density particle side.

Next, modes for implementing the nonaqueous electrolytic solution secondary battery of the present invention will be explained.

FIG. 1 is a diagram showing, in a partial sectional view, a structure of one embodiment, in which a nonaqueous electrolytic solution secondary battery of the present invention is applied to a Li ion secondary battery. In this drawing, reference numeral 1 denotes a battery case (battery canister), made of, for instance, stainless steel. At a bottom of the battery case 1, an insulator 2 is disposed. As a shape of the battery case 1, for instance, a cylinder with a bottom or a rectangular prism with a bottom may be applied. The present invention may be applied to either one of a cylindrical secondary battery and a rectangular prism secondary battery.

The battery case 1 concurrently works as a negative electrode terminal. An electrode group 3 is accommodated, as a power-generating element, in the battery case 1. The electrode group 3 has such a structure in that a belt-like body, in which a positive electrode 4, a separator 5 and a negative electrode 6 are laminated in this order, is wound, for instance, in whirlpool, so that the negative electrode may be located outside. The electrode group 3 is not restricted to the whirlpool-like shape, and may be one in which the positive electrode 4, the separator 5 and the negative electrode 6 are laminated in this order a plurality of times.

A nonaqueous electrolytic solution is filled in the battery case 1 where the electrode group 3 is accommodated. Insulating paper 7 with an opening in the center thereof is disposed at an upper portion of the electrode group 3 in the battery case 1. An insulating shielding plate 8 is disposed at an upper opening of the battery case 1. The insulating shielding plate 8 is liquid-tightly fixed against the battery case 1 by caulking the neighborhood of an upper end of the battery case 1 inwards.

A positive electrode terminal 9 is engaged to the center of the insulating shielding plate 8. One end of a positive electrode lead 10 is connected through a safety valve 11 to the positive electrode terminal 9. Other end of the positive electrode lead 10 is connected to the positive electrode 4. The negative electrode 6 is connected through a negative electrode lead (not shown) to the battery case 1, the negative electrode terminal. Therefrom, a Li ion secondary battery 12, as the nonaqueous electrolytic solution secondary battery, is configured.

Next, the positive electrode 4, the separator 5 and the negative electrode 6, which constitute the electrode group 3, and the nonaqueous electrolytic solution will be explained in detail. First, the positive electrode 4 is prepared by suspending a positive electrode active material of the present invention for secondary batteries, conductive material and a binder in an appropriate solvent, followed by coating the suspension on the current collector and drying, and by making in a sheet.

As the conductive material and binder, which are mixed with the aforementioned positive electrode active material, various kinds of materials, which have been so far used for the nonaqueous electrolytic solution secondary batteries, may be used. For the conductive material, acetylene black, carbon black, graphite, and so on, may be used. For the binder, polytetrafluoroethylene (PTFE), polyvinylidene fluoride (PVDF), ethylene-propylene-diene copolymer (EPDM), styrene-butadiene-rubber (SBR), and so on may be used.

Compounding ratios of the positive electrode active material, the conductive material and the binder are preferable to be, respectively, in the range of from 80 to 95% by mass, from 3 to 20% by mass, and from 2 to 7% by mass. For the current collector, on which the suspension containing the positive electrode active material, the conductive material and the binder is coated, for instance, aluminum foils, stainless steel foils, nickel foils and so on may be used.

Also for the other battery constituent elements, such as the separator 5, the negative electrode 6, the nonaqueous electrolytic solution and so on, various kinds of materials and configurations, which have been so far used for the nonaqueous electrolytic solution secondary batteries, may be applied. For instance, for the separator 5, synthetic resin nonwoven fabric, porous polyethylene film, porous polypropylene film and so on may be used.

The negative electrode 6 is prepared by suspending negative electrode active material and a binder in an appropriate solvent, followed by coating the suspension on the collector and drying, and thereby forming in a sheet. For the negative electrode active material, carbonaceous materials, such as pyrocarbons, pitches and cokes, graphites, glassy carbons, roasted bodies of organic high-polymer compound, such as phenolic resin or furan resin, carbon fibers, active carbon or the like, or lithium metal, lithium alloy, such as Li—Al alloy, polymers, such as polyacetylene or polypyrrole, all of which are capable of storing and releasing lithium ions, may be used. For the binder, the ones similar with that of the positive electrode 5 may be used.

Compounding ratios of the negative electrode active material and the binder are preferable to be in the range of from 90 to 95% by mass for the negative electrode active material and in the range of from 2 to 10% by mass for the binder. For the current collector on which the suspension, containing the negative electrode active material and the binder, is coated, followed by drying, for instance, foils of, for instance, such as copper, stainless steel or nickel, mesh, perforated metal, metal lath or the like may be used.

Furthermore, the nonaqueous electrolytic solution may be prepared by dissolving an electrolyte in a nonaqueous solvent. For the nonaqueous solvent, for instance, various kinds of nonaqueous solvents known as the solvent for the lithium ion secondary batteries may be used. The nonaqueous solvent for the nonaqueous electrolytic solution is not particularly restricted, and, for instance, mixed solvents between propylene carbonate, ethylene carbonate and so on, and dimethyl carbonate, methyl ethyl carbonate, diethyl carbonate, y-butyrolactone, 1,2-dimethoxyethane, 1,2-diethoxyethane, ethoxy-methoxy ethane or the like, may be used.

For the electrolyte, lithium salts, such as $LiPF_6$, $LiBF_4$, $LiClO_4$, $LiAsF_6$, and $LiCF_3O_3$, may be illustrated. A dissolution amount of such electrolytes in the nonaqueous solvent is preferably in the range of from 0.5 to 1.5 mol/L (liter).

In the lithium ion secondary battery 12, in which the aforementioned present invention is applied, since the coarser particles and the higher density particles in the positive electrode active material are removed, the micro-short circuit at the initial charge may be effectively suppressed from occurring, and furthermore, the process failure in the manufacture of the positive electrodes may be suppressed from occurring. Accordingly, the manufacturing yield of the lithium ion secondary batteries 12 may be largely improved. Furthermore, since the coarser particles and the higher density particles may cause the deterioration of the battery characteristics, the removal of these particles allows improving the characteristics of the lithium ion secondary battery 12.

Next, implementation modes of reproduced electronic functional material and a method for reproducing the electronic functional material of the present invention will be explained. First, an implementation mode in which the reproduction method of the present invention is applied to the reproduction of the positive electrode active material for secondary batteries will be explained.

In the manufacturing process of the nonaqueous electrolytic solution secondary batteries, such as the lithium ion secondary batteries, due to the condition adjustment or cutting into a specified dimension, a large volume of the waste electrodes, to which the positive electrode active material adheres, is produced. These are recovered and reproduced as the positive electrode active material. The positive electrode active material is also similarly recovered from the waste electrodes recovered from used secondary batteries. Since all of the lithium containing composite metal oxides, which are used as the positive electrode active material, are expensive, an effect of the reproduction may be large.

Specifically, first, the waste electrodes are cut into an appropriate dimension (for instance, small pieces of 100× 100 mm or less), followed by heat-treatment (primary heat-treatment) at a temperature in the range of from 350 to 450° C. Due to the primary heat-treatment, since the binder contained in the positive electrode active material is partially decomposed, the coating of the positive electrode material is peeled off the Al foils or the like. This is sieved to remove the Al foils. Thereby, the positive electrode material is recovered.

Then, the recovered positive electrode material undergoes the heat-treatment (secondary heat-treatment) at a temperature in the range of from 500 to 700° C. By this secondary heat-treatment, carbon as the conductive material and carbon that is decomposition residue of the binder are burned and removed. For the primary and secondary heat-treatment, though an ordinary heat-treatment furnace and a rotary kiln may be used, the rotary kiln is preferably used in particular for the secondary heat-treatment. The obtained heat-treated substance, as the need arises, is sieved, and, thereby only the powdery positive electrode active material is taken out.

However, the positive electrode active material at this stage contains the coarser particles, such as the agglomerations of the active material and combined bodies of the active material and the binder, the impurity particles (higher density particles and lower density particles), such as the Al foils and ones mingled from an inner wall surface of the heat-treatment furnace, and the finer particles due to brittling in the heat-treatment process. Accordingly, when these are reused as they are, the deterioration of the characteristics of the secondary battery and the lowering of the manufacturing yield may be caused.

Accordingly, a separating process, which makes use of the difference of the resistance force based on the particle size and the density of the active material particles, is applied to the reproduced powdery positive electrode active material. By this separating process, the coarser particles and the higher density particles, or the finer particles and the lower density particles are separated/removed, and thereby the reproduced positive electrode active material of high quality may be obtained. The separating/removing process, as mentioned above, makes use of the difference of the resistance force of the particle against the physical force, such as gravity force, inertial force, centrifugal force and so on, being different depending on the particle size and the density. Various kinds of the classifiers may be used. The specific classification process is as mentioned in the aforementioned manufacturing process of the electrode active material.

The classification conditions, similarly as in the manufacturing process of the positive electrode active material, are preferably set so that the coarser particles, of which particle sizes are 250% or more with respect to the average particle size of the reproduced powdery positive electrode active material, and the higher density particles, of which densities are 120% or more with respect to the average density, may be removed. Also as to the finer particles and the lower density particles, the situations are similar, and the classification conditions are preferably set so that the finer particles, of which particle sizes are 50% or less with respect to the average particle size of the reproduced powdery positive electrode active material, and the lower density particles, of which densities are 75% or less with respect to the average density, may be removed.

The reproduced positive electrode active material obtained through the aforementioned separating/removing process (classification process) satisfies the conditions in that the content of the coarser particles, of which particle sizes are 600% or more with respect to the average particle size, is 1% or less by volume, and the higher density particles, of which densities are 150% or more with respect to the average density, is 1000 ppm or less by mass. Alternatively, the conditions that the content of the finer particles, of which particle sizes are 15% or less with respect to the average particle size, is 1% or less by volume, and the lower density particles, of which densities are 50% or less with respect to the average density, is 1000 ppm or less by mass, are satisfied. The furthermore preferable conditions thereof are the same as in the aforementioned positive electrode active material.

The reproduced positive electrode active material of the present invention is desirable to satisfy all the conditions of the content of the coarser particles, the content of the higher density particles, the content of the finer particles, and the content of the lower density particles. As to the specific particle size and the density, the contents of the coarser particles, of which particle sizes are 30 $\mu$m or more, and the finer particles, of which particle sizes are 0.5 $\mu$m or less, are desirably set, respectively, at 1% or less by volume. In addition, the contents of the higher density particles, of which densities are 7 g/cm$^3$ or more, and the lower density particles, of which densities are 2.5 g/cm$^3$ or less, are desirably set, respectively, at 1000 ppm or less by mass.

The aforementioned reproduced positive electrode active material contains extremely less the coarser particles and the higher density particles, which cause the lowering of the battery yield and the deterioration of the battery characteristics (battery capacity, charge-discharge characteristics and so on), and the finer particles and the lower density particles, which similarly cause the lowering of the battery characteristics. Accordingly, the deterioration of the characteristics and the lowering of the yield are not caused when it is reused in the nonaqueous electrolytic solution secondary battery. According to the present invention, the reproduced positive electrode active material of high quality may be assuredly obtained without undergoing the re-synthesis process.

Next, an implementation mode, in which the reproduction method of the present invention is applied to the reproduction of a phosphor, will be described. The phosphor is used in the manufacture of electron tubes, such as cathode-ray tubes and fluorescent lamps. When manufacturing such electron tubes, the phosphor is used to prepare slurry, and the slurry is used to form a luminescent film. In the course of coating the luminescent films, since a lot of excess phosphor slurry is produced, the excess slurry is recovered, and phosphor powder is reproduced from the recovered phosphor slurry.

Since a red-emitting phosphor is substantially made of expensive rare earth elements, various methods are applied to recover, reproduce, and reuse. In case the impurities mingle relatively less in the recovered red phosphor slurry, after the impurities are physically and mechanically separated/removed, the recovered red phosphor slurry is supplied to drying, sieving process and so on.

In case the recovered red phosphor slurry contains the impurities relatively much, for instance, in case blue phosphor slurry or green phosphor slurry mingles, the following reproduction process is performed. First, the recovered red phosphor slurry, as the need arises, is dispersed in deionized water, and furthermore, as the need arises, foreign material is filtered and removed, followed by chemical wash process, carbon rejection process, and acid wash process, in this order.

The chemical wash process is usually divided in two stages. In the first stage, peroxide, such as hypochlorite (sodium hypochlorite, potasium hypochlorite and so on), is added to the phosphor slurry, followed by stirring, and thereby chromium compounds, such as ammonium dichromate present in the phosphor slurry, is decomposed and removed. Next, after the decomposition product of the chromium compound is water washed, as the second stage, a periodate compound, such as periodate salt (ammonium periodate, potasium periodate and so on), is added, followed by stirring, and thereby an organic compound, such as polyvinyl alcohol contained in the slurry, is decomposed and removed.

Next, the phosphor slurry undergone the chemical wash process is left at rest and allowed to precipitate, and after a water phase is removed outside the system, aqueous ammonia is added as a carbon rejection process, followed by stirring. By leaving at rest after the stirring, the phosphor precipitates and the carbon floats in a supernatant liquid. The supernatant liquid containing the carbon is removed outside the system, and, as the need arises, water wash is performed.

Subsequently, the green phosphor and the blue phosphor, which mingle in the red phosphor slurry, are removed by an acid wash process. As an acid, hydrochloric acid and nitric acid are used, and it is desirable to perform in two-stages in that hydrochloric acid is used in the first stage, and nitric acid is used in the second stage.

Thereafter, the red phosphor slurry undergone the aforementioned process is filtered, and a solid content is taken out, and thereafter by drying, a powdery red phosphor is obtained. However, the red phosphor powder at this stage contains the coarser particles, such as agglomerations of the phosphor powder, the finer particles produced in the drying process and the stirring process, and furthermore, the higher density particles and the lower density particles as contaminants. Accordingly, when it is used as it is, the deterioration of the performance of the cathode-ray tube tends to be caused. For instance, the coarser particles may cause pinholes at the coating of the phosphor, and metal particles as the impurities other than the phosphor may cause a metal contamination. From these, the manufacturing yield of the cathode-ray tubes deteriorates. The finer particles and the lower density particles also may cause the deterioration of quality.

Accordingly, a separating process, which makes use of the difference of the resistance force based on the particle size and the density of the phosphor particle, is applied to the red phosphor powder after drying. By this separating process, the coarser particles and the higher density particles, and the finer particles and the lower density particles are separated/removed, and thereby the reproduced red phosphor powder of high quality may be obtained with reproducibility.

The blue phosphor slurry and the green phosphor slurry, as the need arises, are dispersed in deionized water, furthermore as the need arises, followed by filtering to remove the foreign material, and further followed by hot water wash. The hot water wash process is a process in that the blue or green phosphor slurry is respectively stirred in the hot water, which is heated to a temperature in the range of substantially from 30 to 80° C., and thereby water soluble substances, such as polyvinyl alcohol and chromium compound contained in the individual slurries, are removed. The hot water wash is preferably repeated several times, for instance, four times.

Thereafter, the blue or green phosphor slurry undergone the hot water wash is filtered and a solid content is taken out, followed by drying, thereby the powdery blue or green phosphor is obtained. Since the blue or green phosphor powder at this stage, similarly as the red phosphor powder, contains the coarser particles, the finer particles, the higher density particles, the lower density particles and so on, the separating process, which makes use of the difference of the resistance force based on the particle size and the density of the phosphor particle, is applied. By this separating process, the coarser particles and the higher density particles, and the finer particles and the lower density particles are separated and removed, thereby the reproduced blue or green phosphor powder of high quality is obtained with reproducibility.

Even when the reproduced phosphor powder or the like is classified, it is preferable to use the classifier that satisfies the conditions (1) high in dispersion, (2) high in classification accuracy, and (3) not crushing the particle. As to (1), since the electronic functional material including the phosphor is substantially made of the particles of 20 $\mu$m or less, an agglomerating tendency is high. Accordingly, when a strong dispersion is not applied, the classification may not be implemented based on the sizes of the primary particles. As to (2), it is necessary to separate with high accuracy the coarser particles, the finer particles, the higher density particles, and the lower density particles, which may influence on the performance of the electronic functional material. As to (3), when the dispersion is too strong and the fine particles are produced, the lowering of the yield and the characteristics deterioration of the electronic functional material may be caused.

From these circumstances, also when the various kinds of reproduced electronic functional materials are classified, the classifier capable of satisfying all of the aforementioned conditions (1) through (3) may be preferably employed. As the classifier satisfying the aforementioned conditions, in the reproduction method of the present invention, the dry centrifugal classifier may be preferably used. In particular, the classifier that makes use of the difference of fluid resistance against centrifugal force, and is high in dispersion properties and capable of performing precision classification, is preferably used.

As the coarser particles, which are separated/removed by the classification as mentioned above, the agglomerations (secondary particles) of the electronic functional material including the phosphor, combined bodies (agglomerations) of the phosphor and the binder, or foreign materials (impurity particles) are cited. In consideration of the characteristics of the phosphor after the reproduction, it is preferable for the separating/removing process is implemented by setting the classification conditions so that the coarser particles, of which particle sizes are 250% or more with respect to the average particle size of the reproduced phosphor powder (powdery electronic functional material), and the higher density particles, of which densities are 120% or more with respect to the average density, may be removed.

As to the finer particles and the lower density particles, similarly in consideration of the characteristics after the reproduction of the phosphor, the classification conditions are preferably set so that the finer particles, of which particle sizes are 50% or less with respect to the average particle size of the reproduced phosphor powder, and the lower density particles, of which densities are 75% or less with respect to the average density, may be removed. The finer particles and the lower density particles are separated/removed simultaneously with the coarser particles and the higher density particles in the same operation, based on the selection of the classifier.

In the present invention, the classification conditions are set based on the average particle size and the average density of the phosphor powder before the classification. However, since the content of the particles being removed is slight, the aforementioned average particle size and the average density are substantially the same with the average particle size and the average density of the target reproduced phosphor powder.

The reproduced phosphor powder obtained through the aforementioned separating/removing process (classification process) satisfies the conditions in that the content of the coarser particles, of which particle sizes are 600% or more with respect to the average particle size, is 1% or less by volume, and the higher density particles, of which densities are 150% or more with respect to the average density, is 1000 ppm or less by mass. Alternatively, the conditions in that the content of the finer particles, of which particle sizes are 15% or less with respect to the average particle size, is 1% or less by volume, and the lower density particles, of which densities are 50% or less with respect to the average density, is 1000 ppm or less by mass, are satisfied. The furthermore preferable conditions or the like thereof are the same as in the aforementioned reproduced positive electrode active material.

The aforementioned reproduced phosphor powder contains extremely less the coarser particles and the higher density particles, which cause the deterioration of the coating quality of the luminescent film and the lowering of the manufacturing yield, and the finer particles and the lower density particles, which similarly cause the lowering of brightness. Accordingly, the deterioration of the characteristics is not caused when it is used in the cathode-ray tubes. According to the reproduction method of the present invention, the reproduced phosphor powder of high performance may be assuredly obtained without performing the re-synthesis process. This largely contributes to the reproduction and reuse of the various kinds of electronic functional materials including the phosphor.

The phosphor reproduction method, to which the present invention is applied, is not restricted to the recovery and the reproduction from the phosphor slurry (excess slurry), which is used for manufacturing the cathode-ray tubes, and may be furthermore applied to the recovery and the reproduction from phosphor slurry used for manufacturing other electron tubes, such as fluorescent lamps or the like, and furthermore from the waste cathode-ray tubes and the waste fluorescent lamps.

The reproduction method of the phosphor, to which the present invention is applied, includes recovering the phosphor from the excess phosphor slurry produced in the manufacturing process of the cathode-ray tubes or the waste cathode-ray tubes, and reproducing the phosphor powder by refining the recovered phosphor. In the refining the recovered phosphor, by making use of the difference of the resistance force, which is based on the particle size and density of the particles constituting the phosphor powder, the coarser particles and the higher density particles are simultaneously separated/removed from the phosphor powder. In the separating/removing process, the finer particles and the lower density particles are further separated from the phosphor powder.

Furthermore, the aforementioned separating/removing process (classification) of the coarser particles and the higher density particles, or the finer particles and the lower density particles may exhibits effects not only in the reproduction process of the phosphor powder, but also in the manufacturing process of ordinary phosphor powder. That is, the phosphor powder is manufactured according to the ordinary phosphor manufacturing process. Specifically, after phosphor raw material and flux are mixed and fired, the fired body is washed and dried, thereby phosphor powder is manufactured. When the aforementioned separating/removing process (classification) of the coarser particles, the higher density particles, the finer particles, and the lower density particles is applied to such phosphor powder, more brighter phosphor powder may be obtained. Specific classification conditions are as mentioned above.

According to such manufacturing method of the phosphor powder, the phosphor powder in which the content of the coarser particles, of which particle sizes are 600% or more with respect to the average particle size, or the coarser particles, of which particle sizes are 30 $\mu$m or more, is 1% or less by volume, and the content of the higher density particles, of which densities are 150% or more with respect to the average density, or the higher density particles, of which densities are 7 g/cm$^3$ or more, is 1000 ppm or less by mass, may be obtained. Furthermore, in such phosphor powder, the content of the finer particles, of which particle sizes are 15% or less with respect to the average particle size, or the finer particles, of which particle sizes are 0.5 $\mu$m or less, may be made 1% or less by volume, and the content of the lower density particles, of which densities are 50% or less with respect to the average density, or the lower density particles, of which densities are 2.5 g/cm$^3$ or less, may be made 1000 ppm or less by mass.

In the aforementioned implementation mode, an example where the reproduction method of the present invention is applied to reproduce the positive electrode active material and the phosphor is explained. The reproduction method of the electronic functional material of the present invention and the reproduced electronic functional material are not restricted to the above. For instance, also in case the electronic functional materials, such as magnetic powder for use in magnets, high purity metal powder for use in thin film deposition related to semiconductor and liquid crystal, powder substantially made of carbon, such as toner powder for use in printing, and so on is reproduced, the reproduction method of the present invention may be effectively applied.

Next, specific embodiments of the present invention and evaluation results thereof will be explained.

Embodiment 1

In Embodiment 1, a manufacturing method of the positive electrode active material of the present invention will be explained.

First, cobalt oxide powder and lithium carbonate and tin oxide are mixed with a predetermined ratio, followed by sintering in air at a temperature of 900° C. for 5 hr, thereby Sn containing LiCoO$_2$ powder as the positive electrode active material is obtained. The average particle size (D(50)) of the obtained Sn containing LiCoO$_2$ powder is 3.71 $\mu$m.

Figure 3:
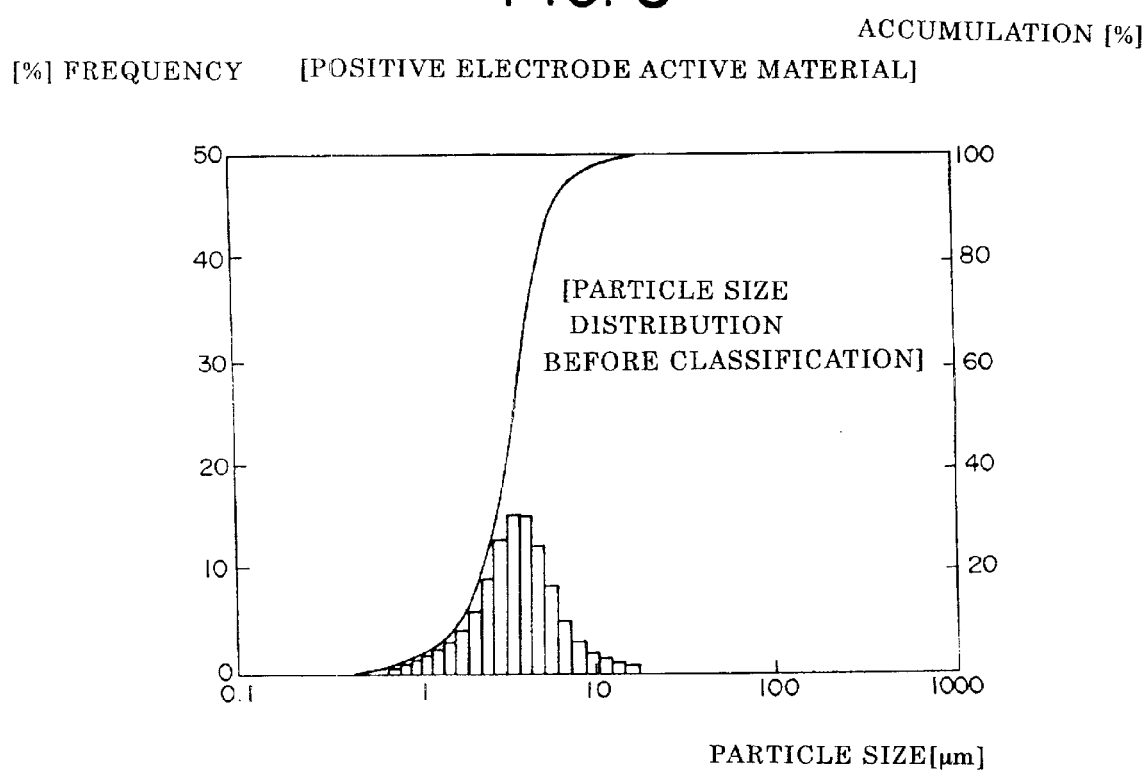
FIG. 3 is a diagram showing a particle size distribution before classification of positive electrode active material for secondary batteries according to Embodiment 1 of the present invention.
Figure 4:
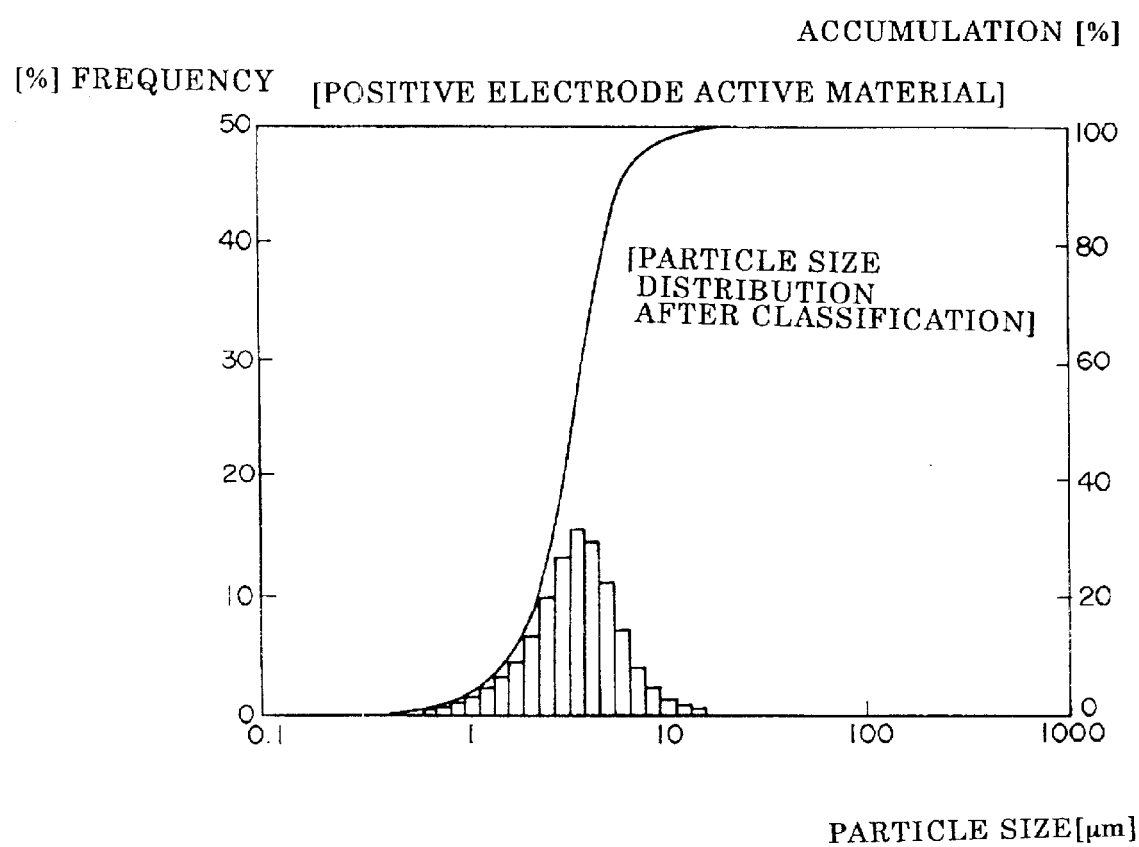
FIG. 4 is a diagram showing a particle size distribution after classification of positive electrode active material for secondary batteries according to Embodiment 1 of the present invention.
Figure 5:
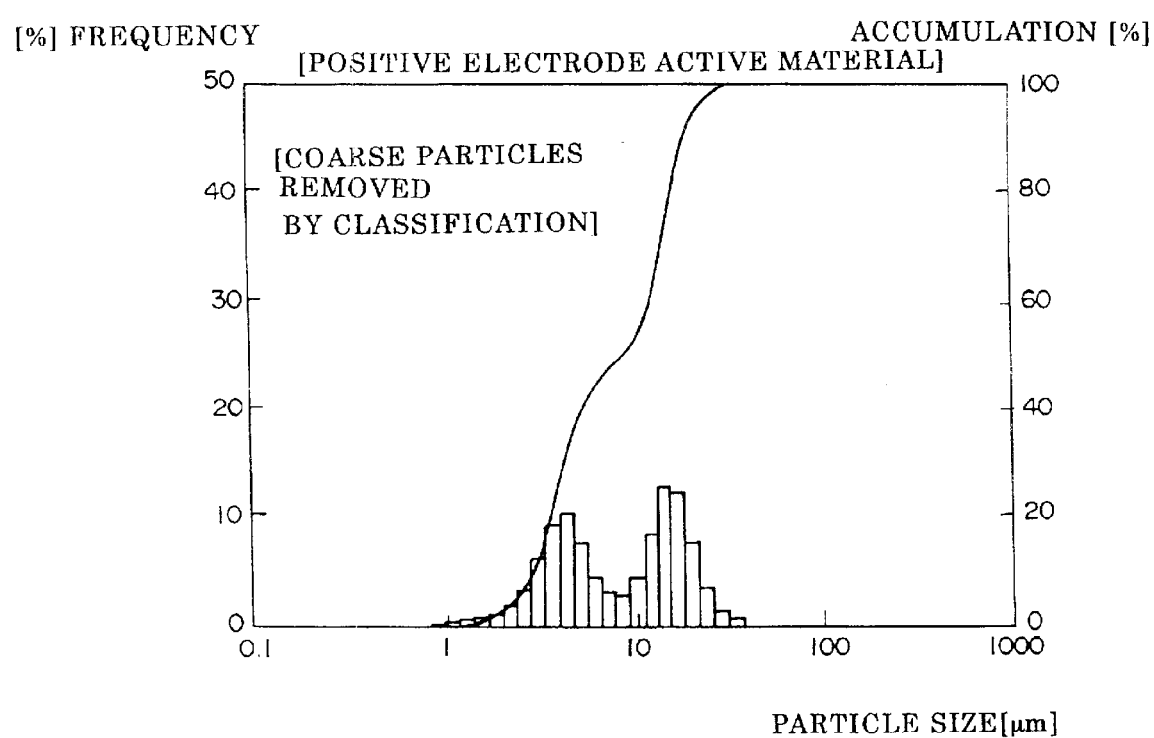
FIG. 5 is a diagram showing a particle size distribution on a side of coarser particles classified in Embodiment 1.
Figure 6:
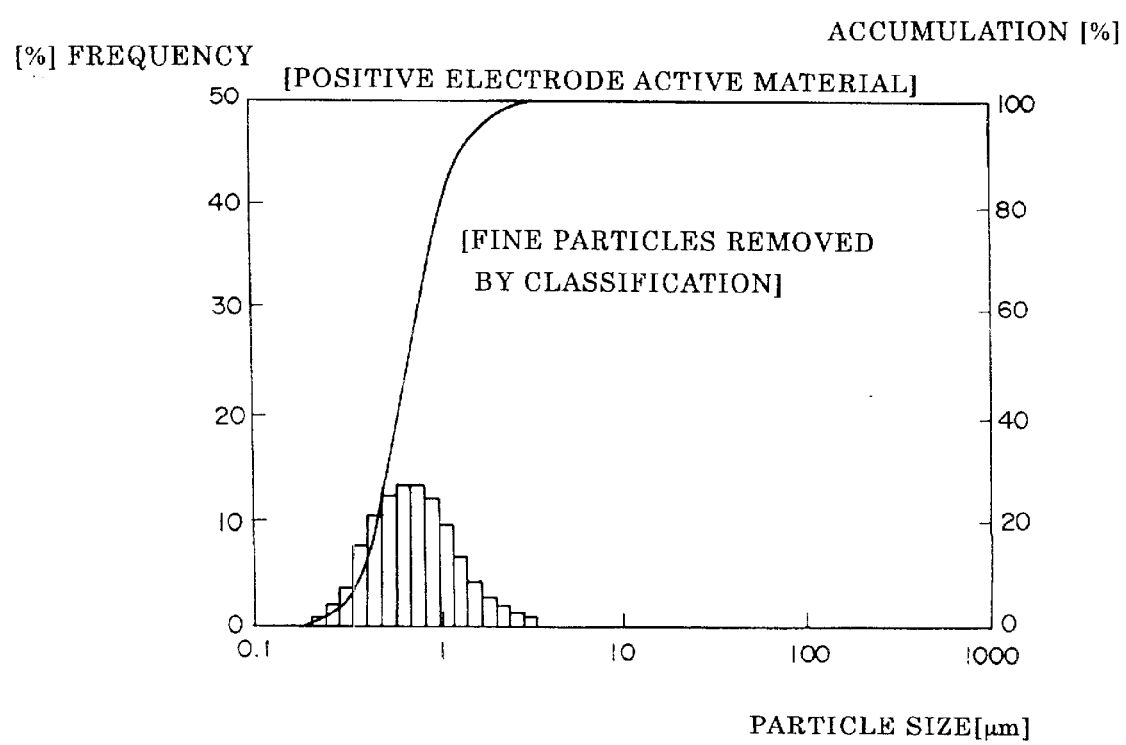
FIG. 6 is a diagram showing a particle size distribution on a side of finer particle classified in Embodiment 1.

The positive electrode active material powder is classified by use of an air classifier, and the coarser particles and the higher density particles, furthermore the finer particles and the lower density particles are removed. By appropriately selecting the volume of air, dispersion conditions, and the number of rotor revolution, the classifier is operated. A yield ratio is 2% for the coarser particle side, 0.5% for the finer particle side, and 97.5% for the positive electrode active material after the removal thereof. These values are cumulative volumes of the particles. Particle size distributions before and after the classification are shown in Table 1 and FIG. 3 and FIG. 4. In addition, the particle size distributions of the removed coarser particles and finer particles are shown in FIG. 5 and FIG. 6.

The particle size distribution of the positive electrode active material is measured in the following ways. First, a specimen of 0.5 g is sampled and put into water of 100 ml, followed by stirring. After ultrasonic dispersion of 100 W and 3 min is applied, the particle size distribution is measured by means of MICROTRACK II PARTICLE-SIZE ANALYZER (manufactured by LEEDS & NORTHRUP INSTRUMENTS). A D(10) value, D(50) value (average particle size), and D(90) value are obtained from the obtained particle size distribution.

TABLE 1

| Particle Size ($\mu$m) | Before Classification | | After Classification | |
|---|---|---|---|---|
| | F | C | F | C |
| 0.20 | 0.00 | 0.00 | 0.00 | 0.00 |
| 0.24 | 0.00 | 0.00 | 0.00 | 0.00 |
| 0.29 | 0.00 | 0.00 | 0.00 | 0.00 |
| 0.34 | 0.00 | 0.00 | 0.00 | 0.00 |
| 0.41 | 0.00 | 0.00 | 0.00 | 0.00 |
| 0.49 | 0.00 | 0.00 | 0.00 | 0.00 |
| 0.58 | 0.39 | 0.39 | 0.38 | 0.38 |
| 0.69 | 0.55 | 0.94 | 0.58 | 0.94 |
| 0.82 | 0.77 | 1.71 | 0.81 | 1.75 |
| 0.97 | 1.06 | 2.77 | 1.18 | 2.93 |
| 1.16 | 1.43 | 4.20 | 1.63 | 4.56 |
| 1.38 | 1.90 | 6.10 | 2.19 | 6.75 |
| 1.64 | 2.57 | 8.67 | 2.95 | 9.70 |
| 1.94 | 3.74 | 12.41 | 4.24 | 13.94 |
| 2.31 | 5.72 | 18.13 | 6.40 | 20.34 |
| 2.75 | 8.79 | 26.92 | 9.65 | 29.99 |
| 3.27 | 12.36 | 39.28 | 13.20 | 43.19 |
| 3.89 | 14.86 | 54.14 | 15.27 | 58.46 |
| 4.62 | 14.72 | 68.86 | 14.44 | 72.90 |
| 5.50 | 11.92 | 80.78 | 11.11 | 84.01 |
| 6.54 | 8.11 | 88.89 | 7.16 | 91.17 |
| 7.78 | 4.85 | 93.74 | 4.09 | 95.28 |
| 9.25 | 2.75 | 96.49 | 2.26 | 97.52 |
| 11.00 | 1.57 | 98.06 | 1.27 | 98.79 |
| 13.08 | 0.94 | 99.00 | 0.75 | 99.54 |
| 15.56 | 0.60 | 99.60 | 0.46 | 100.00 |
| 18.50 | 0.40 | 100.00 | 0.00 | 100.00 |
| 22.0 | 0.00 | 100.00 | 0.00 | 100.00 |
| 26.16 | 0.00 | 100.00 | 0.00 | 100.00 |
| 31.11 | 0.00 | 100.00 | 0.00 | 100.00 |

F = Frequency (%), C = Cumulative Frequency (%)

The particle size distributions before and after the classification hardly show a change, because the coarser particles and the higher density particles are only slightly removed. However, there are a lot of the coarser particles of 10 $\mu$m or more in the particle size distribution of the removed coarser particles; it is found that there are a lot of the coarser particles of 10 $\mu$m or more in the powder before the classification. Furthermore, though it is difficult to confirm in the particle size distribution due to the low frequency thereof, according to visual inspection, there are contained also ultra-coarse particles of substantially 0.5 mm, and these are also removed.

Though the particle size distribution after the classification is ideally a unimodal distribution, bimodal distributions appear frequently as shown in FIG. 5. This is due to a high agglomerating tendency of the powder. That is, the reason for this is in that the primary particles, which are originally small, are agglomerated and classified in the coarser particle side, and the agglomerated particles are loosened before the measurement of the particle size distribution. From the particle size distribution of the removed finer particles, it is found that there are the finer particles of substantially 0.7 $\mu$m in the powder before the classification.

With such positive electrode active material, the lithium ion secondary battery is manufactured in the following ways. Furthermore, as Comparative Embodiment 1 of the present invention, with positive electrode active material, which is manufactured similarly as Embodiment 1 with the exception of the separating/removing process due to the classifier being not implemented, the lithium ion secondary battery is similarly manufactured.

First, the positive electrode active material of 90% by mass, graphite, as the conductive material, of 6% by mass, and polyvinylidene fluoride, as the binder, of 4% by mass are mixed, thereby a positive electrode mixture is prepared. The positive electrode mixture is dispersed in N-methyl-2-pyrolidone and slurry is prepared, the slurry is coated on an aluminum foil, followed by drying, further followed by compression molding by means of a roller press. This is cut into a predetermined dimension, thereby a sheet-like positive electrode is obtained.

Next, carbonaceous material of 93% by mass and polyvinylidene fluoride, as the binder, of 7% by mass are mixed, thereby a negative electrode mixture is prepared. With the exception of the use of the negative electrode mixture, similarly as the positive electrode, a sheet-like negative electrode is manufactured.

The aforementioned sheet-like positive electrode, the separator, made of a porous polyethylene film, and the sheet-like negative electrode are laminated in this order, the laminated body is wound in whirlpool so that the negative electrode may be positioned outside, thereby an electrode group is prepared. A lead is attached to the electrode group, thereafter the electrode group with the lead is accommodated in a cylindrical battery case with bottom (battery canister). Furthermore, the nonaqueous electrolytic solution is enclosed, thereby a cylindrical lithium ion secondary battery is assembled. The nonaqueous electrolytic solution is prepared by dissolving $LiPF_6$, at a concentration of 1 mol/L, in a 1:1 mixed solvent of ethylene carbonate and methyl ethyl carbonate.

The characteristics of thus manufactured cylindrical lithium ion secondary batteries according to Embodiment 1 and Comparative Embodiment 1 are measured and evaluated in the following ways. These measurements are shown in Table 2.

[Voltage Drop at Initial Charge]

At the first charge of the assembled battery, under an environment of 20° C., with a current limit of 1 A, a constant voltage charge at 4.2 V is performed for 5 hr. These are reserved for 10 days at room temperature, thereafter a voltage is measured, and a voltage drop at that time is checked.

[Cycle Characteristics Test]

Under an environment of 20° C., with a current limit of 1 A, a constant voltage charge at 4.2 V is performed for 5 hr, after a pause of 1 hr, discharge is performed at 1 A to 2.7 V. Then, after a further pause of 1 hr, under the above conditions, the charge is implemented. This cycle is repeated 300 times, and a ratio (Cap (300th)/Cap (1st)) between the discharge amount of 1st time and the discharge amount at 300th time is measured.

[Discharge Capacity]

A discharge capacity a unit weight of the active material is obtained by dividing the discharge amount at the first discharge that evaluates the aforementioned cycle characteristics by a weight of the used active material (10 g).

[The Number of Process Failure]

The number of failures in the electrode manufacturing process is checked with the number of times of the clogging of the coating bed as an index.

TABLE 2

| | Voltage Drop (V) | Capacity Maintenance Rate (%) | Discharge Capacity (mAh/g) | The Number of Process Failures |
|---|---|---|---|---|
| Embodiment 1 (Before Classification) | 0.01 | 85 | 145 | 0 times/day |
| Comparative Embodiment 1 (After Classification) | 0.20 | 70 | 138 | 5 times/day |

It is obvious from Table 2 that the lithium ion secondary batteries according to Embodiment 1, where the classified positive electrode active material is used, are not only excellent in their battery characteristics but also less in the number of times of the process failure occurrence.

Embodiment 2

In the similar ways as Embodiment 1, the positive electrode active material (Sn containing $LiCoO_2$ powder) is A prepared. At this time, by changing the classification conditions, 12 kinds of specimens, which are different in the conditions for removing the coarser particles and the higher density particles, are obtained. From each of the specimens, a sample for analysis is sampled, and amounts of the impurities are measured in the following ways. Furthermore, with each of the specimens, in the similar ways as Embodiment 1, a lithium ion secondary battery is manufactured, and the voltage drop under the same conditions as Embodiment 1 is measured. These results are shown in Table 3.

The measurements of the amounts of the impurities are implemented by first dissolving under heating part of the individual samples with aqua regia, and followed by measuring Fe content, Zn content, and Cu content in a liquid where the sample is completely dissolved, by means of ICP analysis. The analysis results show total amounts of individual impurities of Fe, Zn, and Cu in the positive electrode active material.

Next, each remainder of the individual samples is dissolved with an oxalic acid solution (10% solution), and after the solution is filtered, Fe content, Zn content, and Cu content in a filtrate are measured by means of ICP analysis. The analysis results show the individual impurity contents of Fe, Zn, and Cu present as metal particles in the positive electrode active material. The analysis results correspond to the contents of the higher density particles in the positive electrode active material of claim 1.

TABLE 3

| Sample No. | Componential Analysis (Fe) | | Componential Analysis (Zn) | | Componential Analysis (Cu) | | Voltage Drop (mV) |
|---|---|---|---|---|---|---|---|
| | T | O | T | O | T | O | |
| E2 | | | | | | | |
| 1 | 110 | 10 | 16 | 0.1 | 8 | 0.3 | 10 |
| 2 | 120 | 20 | 24 | 0.2 | 6 | 0.1 | 20 |
| 3 | 200 | 18 | 13 | 0.4 | 7 | 0.1 | 20 |
| 4 | 210 | 12 | 20 | 0.3 | 5 | 0.2 | 40 |
| 5 | 130 | 15 | 17 | 0.1 | 10 | 0.1 | 10 |
| 6 | 120 | 10 | 12 | 0.2 | 8 | 0.3 | 20 |
| 7 | 130 | 90 | 21 | 0.2 | 9 | 0.4 | 680 |
| 8 | 80 | 12 | 18 | 5 | 8 | 0.5 | 550 |
| 9 | 130 | 10 | 16 | 0.6 | 10 | 4 | 1100 |
| CE2 | | | | | | | |

TABLE 3-continued

| Sample No. | Compo- nential Analysis (Fe) | | Compo- nential Analysis (Zn) | | Compo- nential Analysis (Cu) | | Voltage Drop (mV) |
|---|---|---|---|---|---|---|---|
| | T | O | T | O | T | O | |
| 10 | 800 | 500 | 400 | 300 | 500 | 400 | 4200 |
| 11 | 600 | 500 | 300 | 300 | 400 | 300 | 4200 |
| 12 | 1300 | 1000 | 500 | 400 | 300 | 300 | 4200 |

E2 = Embodiment 2, CE2 = Comparative Example, T = Total Amount (ppm), O = Oxalic Acid Soluble Component (ppm)

It is obvious from Table 3 that when there is a large amount of the oxalic acid soluble component, the voltage drop of the secondary battery is large. As to the Fe, though the oxalic acid soluble component (amount of metallic impurity) of substantially from 10 to 20 ppm hardly causes the voltage drop, substantial 90 ppm or more of the oxalic acid soluble component causes a large voltage drop. As to Cu and Zn, the oxalic acid soluble component of only substantial several parts per million causes the voltage drop.

Embodiment 3

First, lithium carbonate and cobalt oxide ($Co_3O_4$) are mixed so that an atomic ratio of Li:Co may be 1:1, followed by sintering in air at a temperature of 900° C. for 5 hr, thereby $LiCoO_2$, the positive electrode active material, is synthesized. Then, the obtained $LiCoO_2$ is milled by means of a pulverizer to an average particle size of substantial 5 $\mu$m. The $LiCoO_2$ powder aftermilling is classified by means of the dry centrifugal classifier, thereby the powdery metallic impurities (higher density particles) are separated/removed from the $LiCoO_2$ powder.

The $LiCoO_2$ powder, which is threw into the centrifugal classifier from a raw material input port, rides on an air stream and is sufficiently dispersed in an attached dispersion area, and thereafter, is sent into a classification area. The $LiCoO_2$ powder is subjected to centrifugal force due to a rotary flow of a classifier rotor and resistance force of airflow, which flows from a tangential direction towards a center. The coarser particles are more influenced by the centrifugal force, and the finer particles are more influenced by the air resistance. The metal impurity particles or the like are flown outside of the classifier rotor due to the centrifugal force and recovered through a collecting cyclone at a coarse-particle recovering portion. The $LiCoO_2$ particles having proper particle size are sent inside of the rotor together with the airflow, proceed past through the collecting cyclone, and are recovered at a fine-particle recovering portion.

In the dry classifier as mentioned above, the classification point may be easily controlled by adjusting the number of revolutions with the airflow rate kept constant. In this embodiment, with the classification point adjusted at 15 $\mu$m, the metal impurity particles contained in $LiCoO_2$ powder are separated/removed.

When the impurity amount (total amount) in the positive electrode active material ($LiCoO_2$) after the classification is analyzed by means of ICP, it is found that Fe is 200 ppm or less; Cu, 50 ppm or less; Zn, 20 ppm or less; Ni, 400 ppm or less; and, Mn, 40 ppm or less. Furthermore, when the positive electrode active material, to which several hundred parts per million of Cu particles of 10 $\mu$m and Fe particles of 10 $\mu$m are added, is classified under the same conditions as the aforementioned conditions, substantially all of Cu particles and Fe particles are recovered at the coarser particle recovering portion. This shows that under the aforementioned conditions, the metal impurity particles of 10 $\mu$m or more are removed.

Next, with the positive electrode active material ($LiCoO_2$) recovered at the fine-particle recovering portion, lithium ion secondary batteries are manufactured in the following ways.

First, the positive electrode active material of 91% by mass, acetylene black of 2.7% by mass and graphite of 2.7% by mass as the conductive material, and fluorocarbon resin of 3.6% by mass as the binder are mixed, thereby the positive electrode mixture is prepared. The positive electrode mixture is dispersed in N-methyl-2-pyrolidone, thereby slurry is prepared, the slurry is coated on both surfaces of an aluminum foil and dried, followed by compression molding into one-side thickness of 100 $\mu$m by means of a roller press. This is cut into a predetermined dimension and sheet-like positive electrodes are obtained.

Next, 90% by mass of mesophase pitch carbon fiber of an average diameter of 10 $\mu$m and an average length of 18 $\mu$m, 7% by mass of carbonaceous conductive filler, and 3% by mass of styrene-butadiene rubber (SBR), a rubber-based binder, are mixed, and thereby a negative electrode mixture is prepared. The negative electrode mixture is suspended in a solvent, thereby slurry is prepared, followed by coating on both surfaces of a copper foil and by drying, further followed by compression-molding in a single side thickness of 100 $\mu$m by means of a roller press. This is cut into a predetermined dimension, and thereby sheet-like negative electrodes are prepared.

With the aforementioned sheet-like positive electrodes and negative electrodes, cylindrical lithium ion secondary batteries are assembled in the similar ways as Embodiment 1. The secondary batteries are charged, under an environment of 20° C., at a constant current (1600 mA), to a voltage 4.2 V, further followed by a constant voltage charge at 4.2 V for 3 hr. These are reserved for 1 week at room temperature, and thereafter a voltage is measured. A voltage drop at that time is checked. One of which voltage drop is 80 mV or more is counted as a failure; thereby the rate of incidence of the voltage drop failure at the initial charge is checked. The results are shown in Table 4.

Embodiment 4

With the exception in that the removing the metal impurity particles is performed after the conductive material and the binder are added to the positive electrode active material, followed by mixing, in the similar ways as Embodiment 3, positive electrodes are prepared. Furthermore, with the positive electrodes, lithium ion secondary batteries like ones in Embodiment 3 are manufactured. Of such lithium ion secondary batteries, in the similar ways as Embodiment 3, the rate of incidence of the voltage drop failure at the initial charge is checked. The results are shown in Table 4.

Embodiment 5

With the exception in that, in the removing process of the metal impurity particles, the agglomerated particles are milled by means of a jet mill before the classification, in the similar ways as Embodiment 3, positive electrodes are prepared. Furthermore, with the positive electrode, lithium ion secondary batteries like ones in Embodiment 3 are manufactured. Of such lithium ion secondary batteries, in the similar ways as Embodiment 3, the rate of incidence of the voltage drop failure at the initial charge is checked. The results are shown in Table 4.

Embodiment 6

With the exception in that, in the removing process of the metal impurity particles, the particles that are recovered at the coarse particle side recovering portion are reclassified with the classification point of 15 $\mu$m, thereby obtaining the active material of which particle sizes are large, in the similar ways as Embodiment 3, positive electrodes are prepared. Furthermore, with the positive electrodes, lithium ion secondary batteries similar as Embodiment 3 are manufactured. Of such lithium ion secondary batteries, in the similar ways as Embodiment 3, the rate of incidence of the voltage drop failure at the initial charge is checked. The results are shown in Table 4.

Comparative Embodiment 3

With the exception in that the impurity particles are not separated by means of the classification, in the similar ways as Embodiment 3, positive electrodes are prepared. Furthermore, with the positive electrodes, lithium ion secondary batteries similar as Embodiment 3 are manufactured. Of such lithium ion secondary batteries, in the similar ways as Embodiment 3, the rate of incidence of the voltage drop failure at the initial charge is checked. The results are shown in Table 4.

TABLE 4

|  | Active Material Recovery Rate after Classification (%) | Rate of Voltage Drop Failure due to Initial Charge (%) |
| --- | --- | --- |
| Embodiment 3 | 97 | 0.7 |
| Embodiment 4 | 96 | 0.7 |
| Embodiment 5 | 97 | 0.5 |
| Embodiment 6 | 99 | 0.7 |
| Comparative Example 3 | (Un-classified) | 10.0 |

It is obvious from Table 4 that the lithium ion secondary batteries of individual embodiments, in which the positive electrode active materials after the classification are used, are largely lower in the rate of incidence of the voltage drop failure at the initial charge, in comparison with Comparative Embodiment 3, where the classification is not implemented.

Embodiment 7

In this embodiment, an example where the reproduction method of the present invention is applied to the reproduction of the positive electrode active material for secondary batteries will be explained.

In the manufacturing process of the positive electrodes in Embodiment 1, a lot of the positive electrode waste (waste electrodes) is produced. Specifically, these are cutting waste produced at the cutting after the coating, and positive electrode waste used for adjusting the coating conditions to a predetermined coating thickness. The positive electrode active material is recovered and reproduced from the positive electrode waste in the following ways.

First, the positive electrode waste is processed into chips of 100×100 mm or less by means of a shredder. These chips are heat-treated at a temperature of 400° C. in a box-type heating furnace. Since the coatings are peeled off the Al foils by this heat-treatment, both is separated by use of a sieve. Next, the positive electrode waste, from which Al is removed, is further heat-treated (by means of the rotary kiln) at a temperature of 600° C.; the binder component and carbon component are burned off; thereby, only powdery positive electrode active material is taken out.

Furthermore, the aforementioned positive electrode active material is classified by use of an air classifier. By appropriately selecting the operating conditions of the classifier at this time, the amounts, particle sizes, and densities of the coarser particles being removed, the higher density particles being removed, the finer particles being removed and the lower density particles being removed are controlled. The particle size distributions are measured according to the method mentioned above.

With thus obtained reproduced positive electrode active material, in the similar ways as Embodiment 1, lithium ion secondary batteries are manufactured. In addition, as Comparative Embodiment 4, with the exception in that the process for separating/removing the coarser particles, the higher density particles, the finer particles, and the lower density particles is not implemented, in the similar ways as Embodiment 7, with the reproduced positive electrode active material, which is recovered and reproduced from the positive electrode waste, lithium ion secondary batteries are manufactured. Each of the lithium-cobalt composite oxides due to Embodiment 7 and Comparative Embodiment 4 is analyzed by use of powder X-ray diffraction due to Cu Kα line and is found to be substantially the same as a diffraction pattern of $LiCoO_2$.

Figure 7:
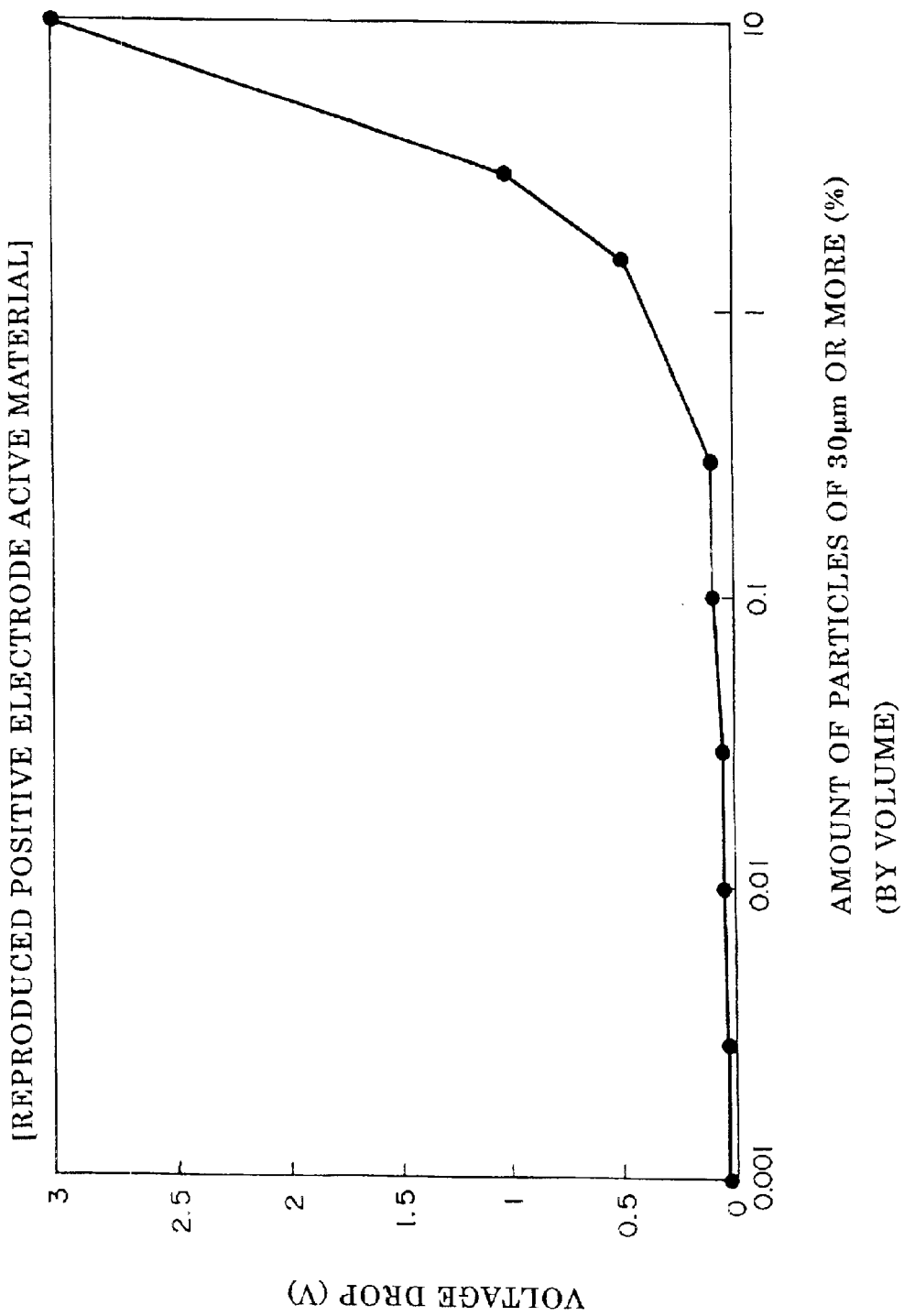
FIG. 7 is a diagram showing relationship between content of coarser particles of 30 $\mu$m or more in positive electrode active material reproduced according to Embodiment 7 of the present invention and voltage drop.
Figure 8:
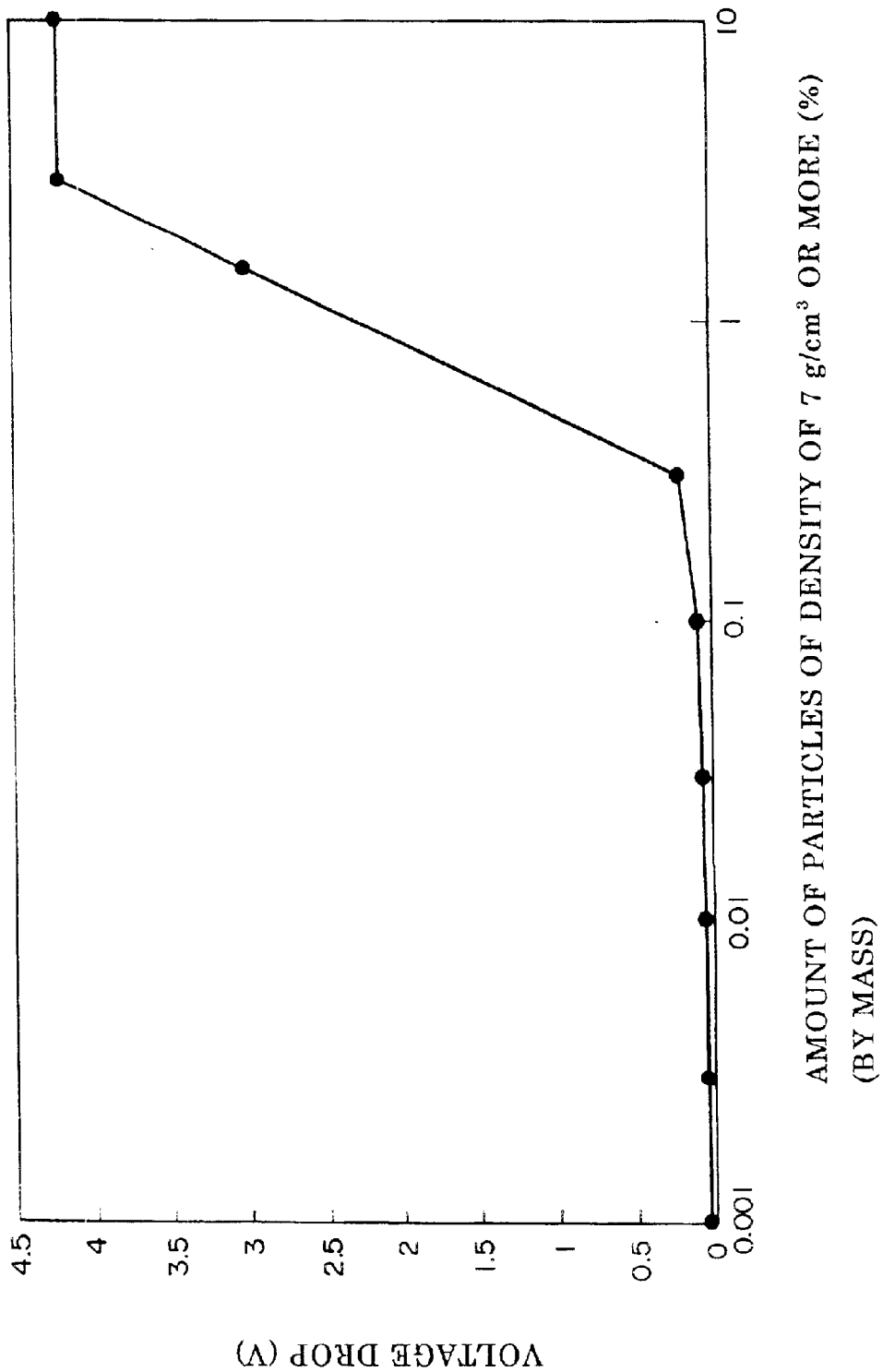
FIG. 8 is a diagram showing relationship between content of higher density particles of 7 g/cm$^3$ or more in positive electrode active material reproduced according to Embodiment 7 of the present invention and voltage drop.
Figure 9:
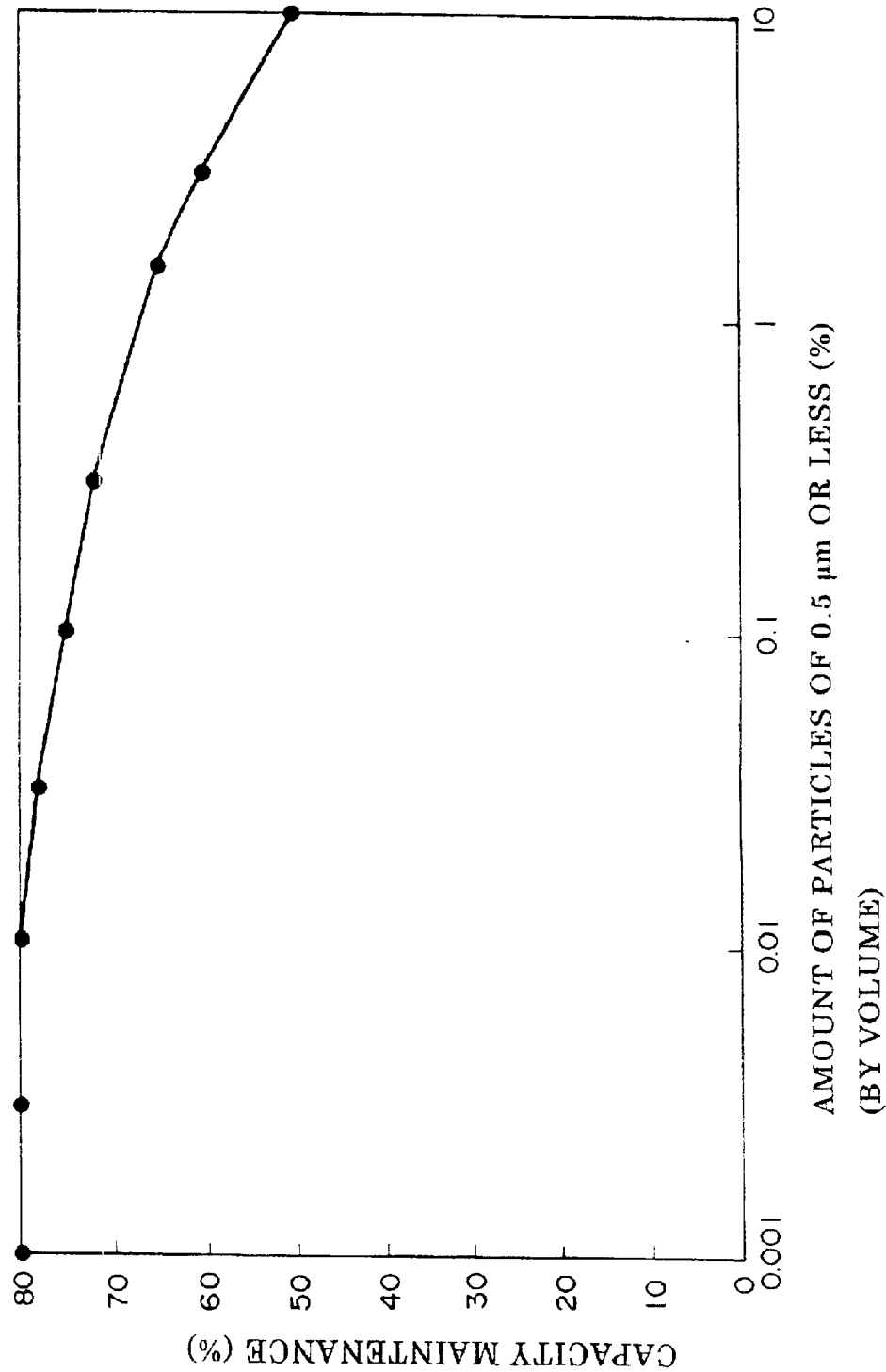
FIG. 9 is a diagram showing relationship between content of finer particles of 0.5 $\mu$m or less in positive electrode active material reproduced according to Embodiment 7 of the present invention and capacity maintenance rate.
Figure 10:
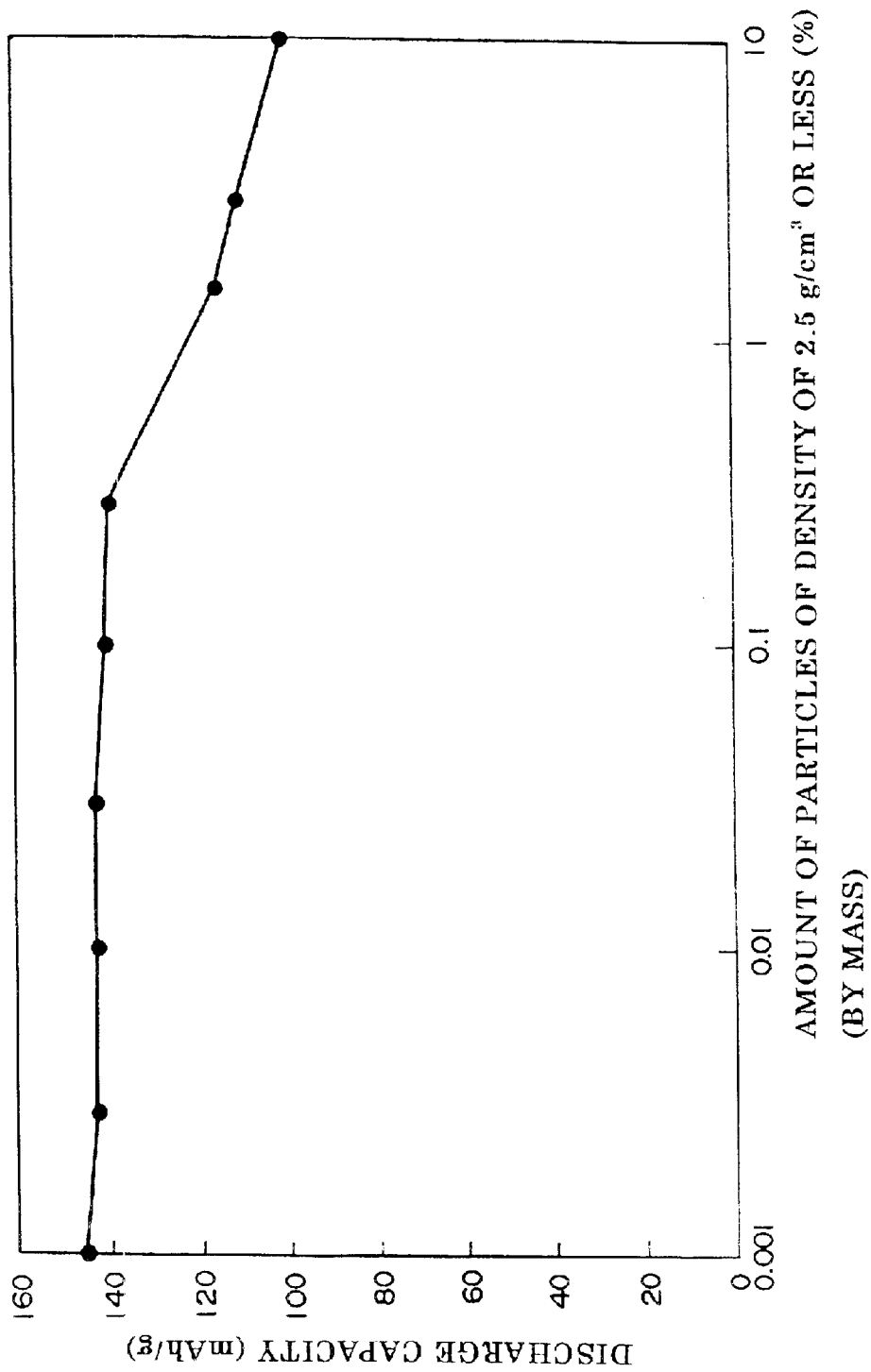
FIG. 10 is a diagram showing relationship between content of lower density particles of 2.5 g/cm$^3$ or less in positive electrode active material reproduced according to Embodiment 7 of the present invention and discharge capacity.

The characteristics of thus manufactured individual cylindrical lithium ion secondary batteries of Embodiment 7 and Comparative Embodiment 4 are measured and evaluated similarly as Embodiment 1. The evaluation results of the characteristics are shown in FIG. 7 through FIG. 10. FIG. 7 shows relationship between the content (by volume) of the coarser particles, of which particle sizes are 30 μm or more, in the reproduced positive electrode active material and the voltage drop; FIG. 8, relationship between the content (by mass) of the higher density particles, of which densities are 7 g/cm$^3$ or more, in the reproduced positive electrode active material and the voltage drop; FIG. 9, relationship between the content (by volume) of the finer particles, of which particle sizes are 0.5 μm or less, in the reproduced positive electrode active material and the capacity maintenance rate; and, FIG. 10, relationship between the content (by mass) of the lower density particles, of which densities are 2.5 g/cm$^3$ or less, in the reproduced positive electrode active material and the discharge capacity.

It is obvious from FIG. 7 that in the batteries that use the positive electrode active material, in which a lot of the coarser particles are contained, the voltage drop is large and short circuit is occurred in the battery. From FIG. 8, it is found that in the batteries that use the positive electrode active material, in which a lot of the higher density particles are contained, the voltage drop is large and short circuit is occurred in the battery. Furthermore, from FIG. 9, it is found that the capacity maintenance rate deteriorates when the finer particles are contained a lot, and from FIG. 10, it is found that the discharge capacity deteriorates when the lower density particles are contained a lot.

Embodiment 8

In the present embodiment, an example where the reproduction method of the present invention is applied to the reproduction of phosphor powder will be explained.

The phosphor slurry, which is recovered in the course of coating phosphor films on glass panels of color cathode-ray tubes, is thrown into a stirring vessel. The phosphor slurry contains red phosphor $Y_2O_2S$: Eu and other additives and impurities. Deionized water is added into the stirring vessel, followed by stirring, and after the phosphor slurry is sufficiently dispersed in water, this is passed through a nylon mesh of 100-mesh to remove foreign material. Then, the slurry is allowed to settle, and a water phase is removed outside the system, and, the following processes are implemented in turn.

First, the aforementioned slurry is transferred into the mixing vessel, deionized water and an aqueous solution of sodium hypochlorite, of which chlorine content is 5%, are added, followed by stirring, thereby chromium compounds in the slurry are decomposed due to oxidation. Thereafter, water-wash with deionized water is repeated three times.

Then, deionized water heated to a temperature of 80° C. and potassium periodate are added, followed by stirring, thereby polyvinyl alcohol present in the slurry is decomposed due to oxidation. After the slurry is allowed still standing and settling, the water phase is removed outside of the system.

Next, deionized water and ammonia water are added to the slurry, which is left in the stirring vessel, followed by allowing still standing and settling for 10 hr. Thereafter, a supernatant liquid is removed outside the system together with carbon floating in the supernatant liquid.

Water heated to a temperature of 70° C. and a 35% aqueous solution of hydrochloric acid are added to the slurry remained in the stirring vessel, followed by stirring. Thereafter, the slurry is allowed still standing and settling, and the water phase is removed outside the system, followed by water wash twice with deionized water. To this, deionized water and concentrated nitric acid are added, followed by stirring, thereafter the slurry is allowed still standing and settling, followed by removing the water phase outside the system. Furthermore, the water wash with deionized water is repeated until pH becomes 5.5. Thereafter, the water washed slurry is filtered and a solid content is taken out, followed by drying, thereby red phosphor powder is obtained.

The obtained red phosphor powder is classified by use of the air classifier. By appropriately selecting the operating conditions of the classifier at this time, the amounts, the particle sizes and the densities of the coarse particles being removed, the higher density particles being removed, the finer particles being removed and the lower density particles being removed may be controlled.

With several kinds of red phosphor powders, to which the aforementioned classification is applied, and the red phosphor powder (Comparative Embodiment 5), which is reproduced similarly with the exception that the classification is not applied, according to an ordinary method, dot-type phosphor films are, respectively, formed. The characteristics of the individual phosphor films thus obtained are evaluated in the following ways.

Figure 11:
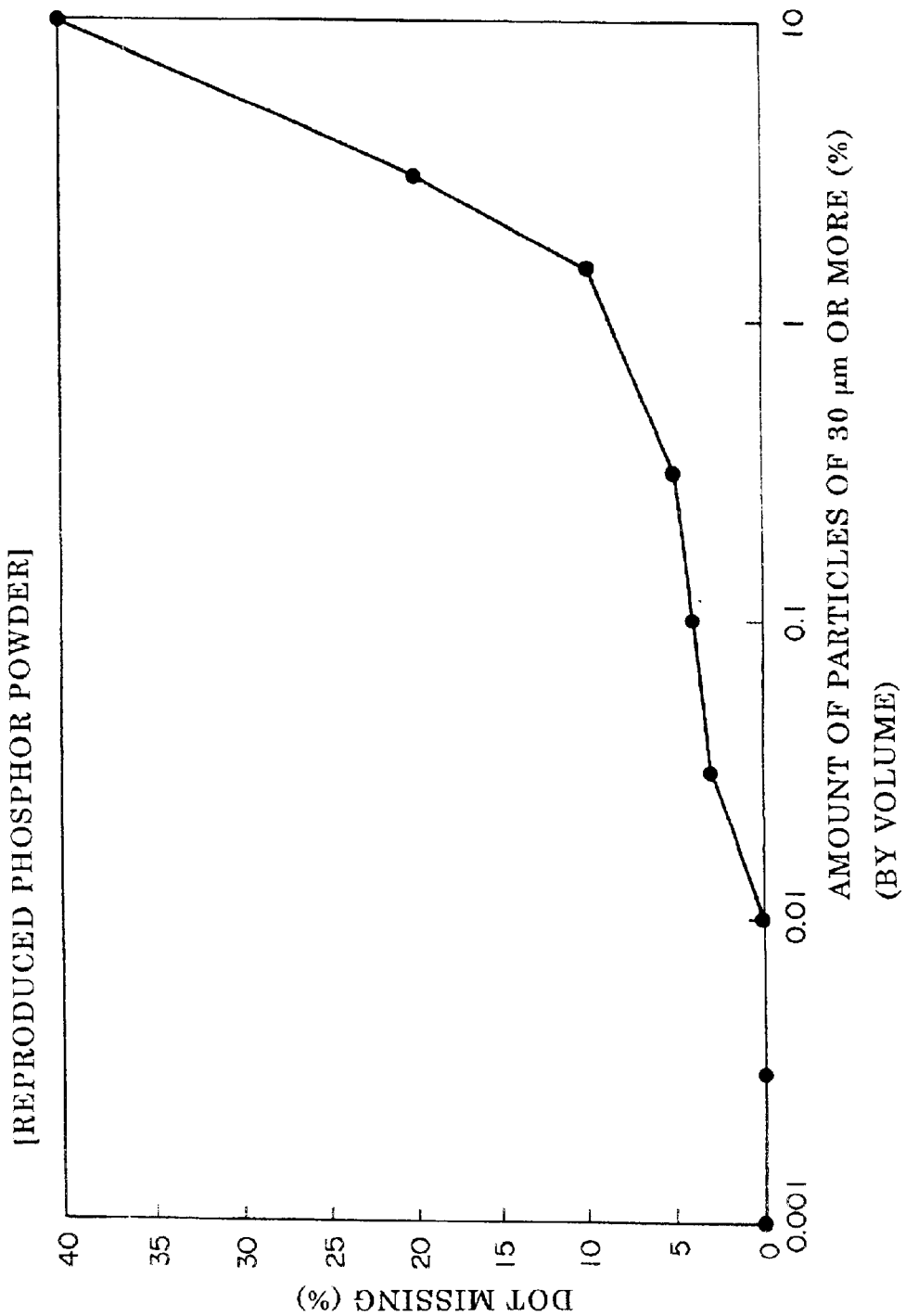
FIG. 11 is a diagram showing relationship between content of coarser particles of 30 $\mu$m or more in phosphor powder reproduced according to Embodiment 8 of the present invention and percentage of missing dots in a phosphor film.
Figure 12:
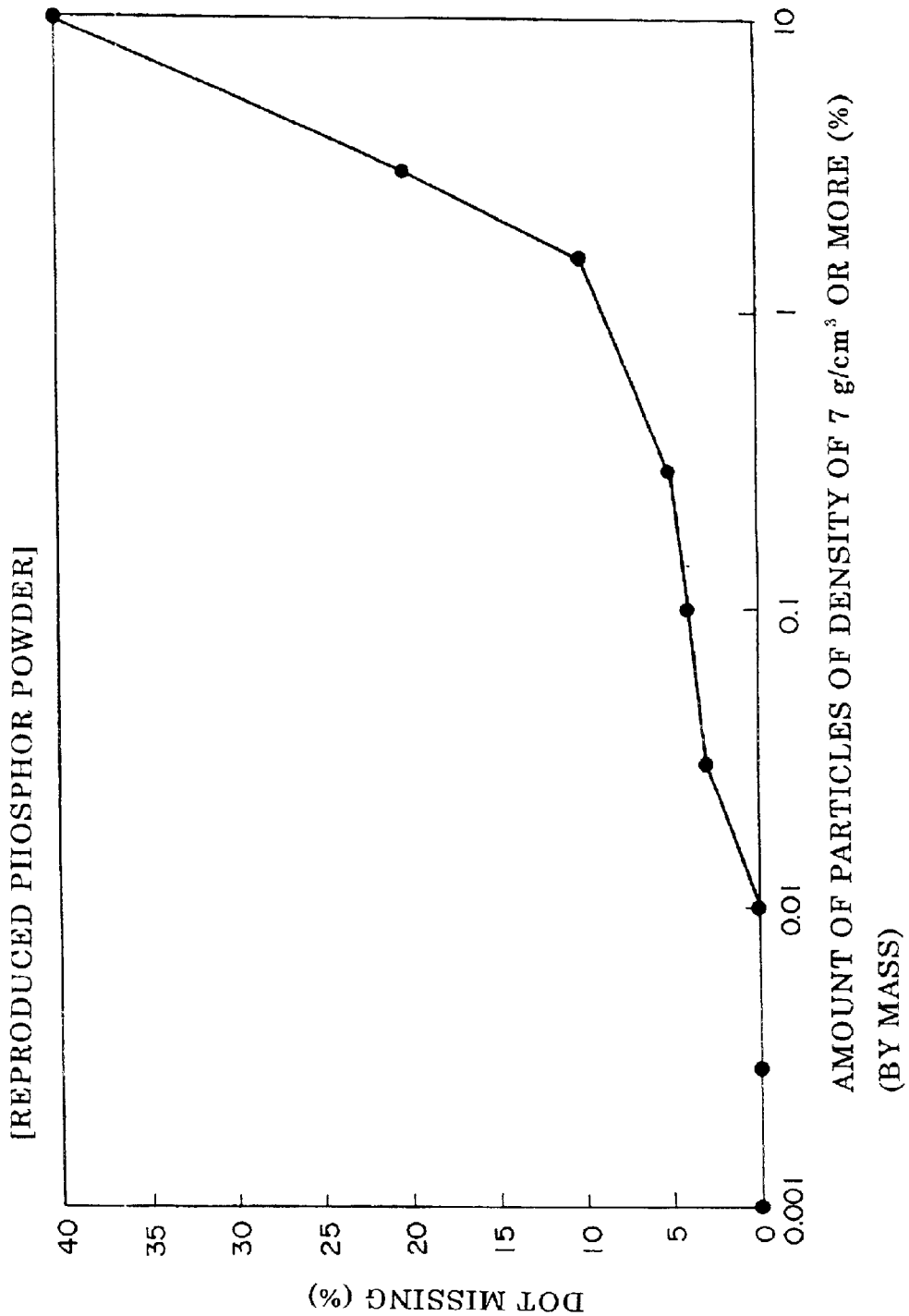
FIG. 12 is a diagram showing relationship between content of higher density particles of 7 g/cm$^3$ or more in phosphor powder reproduced according to Embodiment 8 of the present invention and percentage of missing dots on a phosphor film.

First, relationship between the content (by volume) of the coarser particles, of which particle sizes are 30 $\mu$m or more, in the reproduced red phosphor powder and the amount of dot-missing in the phosphor film, and furthermore relationship between the content (by mass) of the higher density particles, of which densities are 7 g/cm$^3$ or more, in the reproduced red phosphor powder and the amount of dot-missing in the phosphor film are investigated. The amount of the missing-dots denotes a ratio (area) of a dot-missing portion to a portion where phosphor-dots have to remain, when unexposed portion is removed in the exposing and developing process. These results are shown in FIG. 11 and FIG. 12. It is obvious from these figures that by separating/removing the coarser particles, of which particle sizes are 30 $\mu$m or more, and the higher density particle, of which densities are 7 g/cm$^3$ or more, from the reproduced red phosphor powder, the phosphor films of high quality may be obtained.

Figure 13:
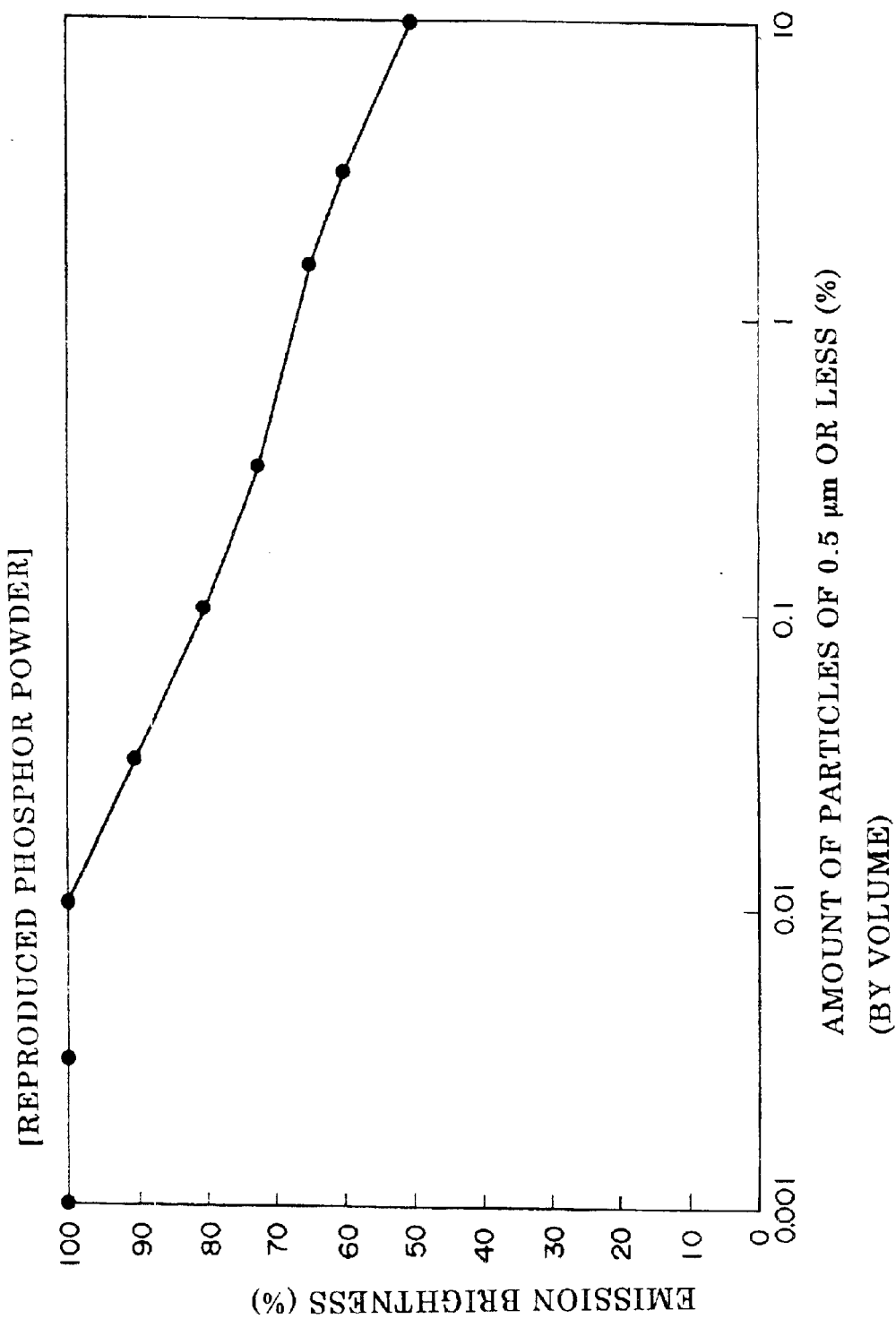
FIG. 13 is a diagram showing relationship between content of finer particles of 0.5 $\mu$m or less in phosphor powder reproduced according to Embodiment 8 of the present invention and emission brightness of the phosphor film.
Figure 14:
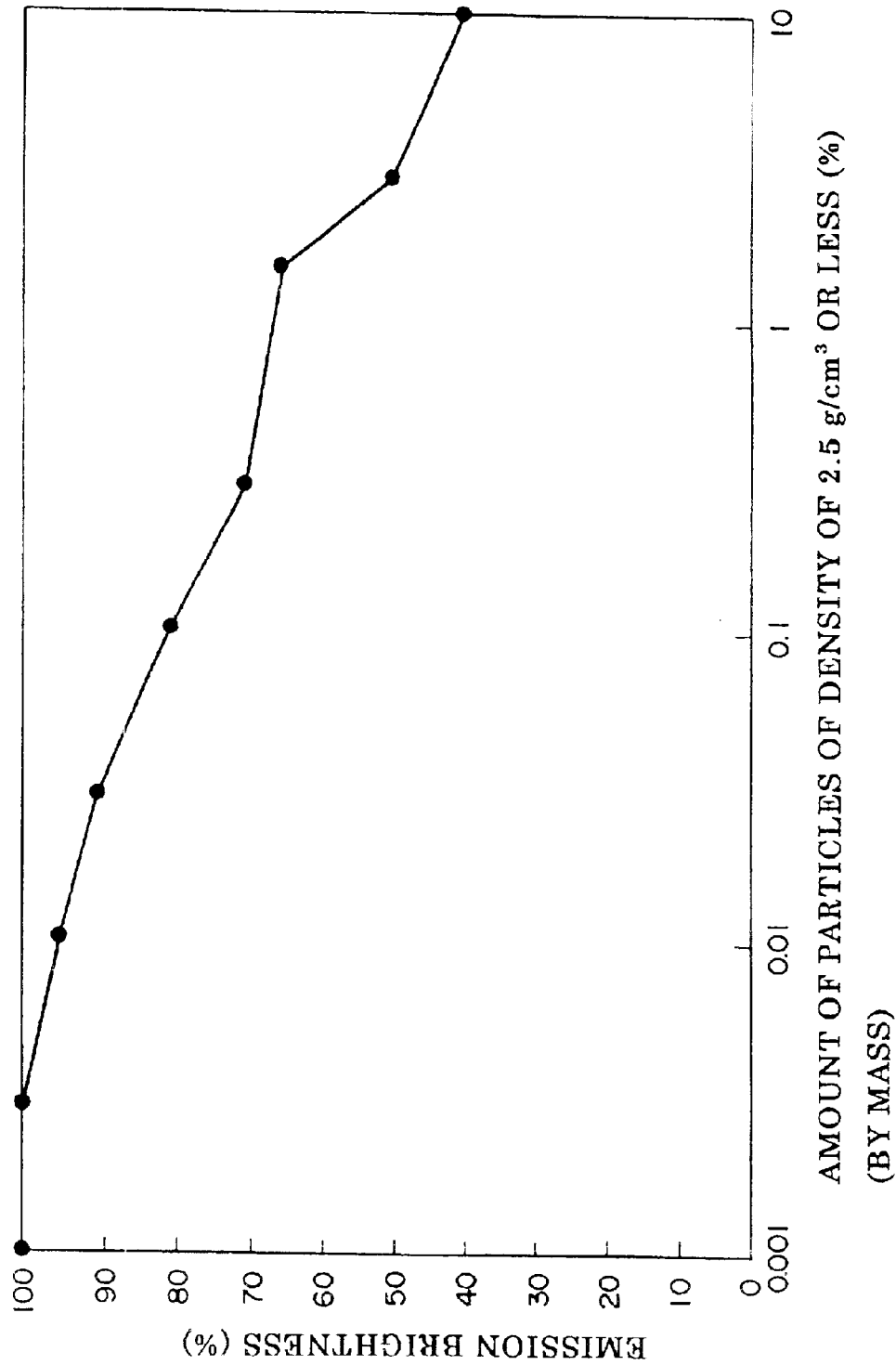
FIG. 14 is a diagram showing relationship between content of lower density particles of 2.5 g/cm$^3$ or less in phosphor powder reproduced according to Embodiment 8 of the present invention and emission brightness of the phosphor film.

Next, relationship between the content (by volume) of the finer particle, of which particle sizes are 0.5 $\mu$m or less, in the reproduced red phosphor powder, and the brightness of the phosphor film, and furthermore relationship between the content (by mass) of the lower density particle, of which densities are 2.5 g/cm$^3$ or less, in the reproduced red phosphor powder, and the brightness of the phosphor film, are investigated. These results are shown in FIG. 13 and FIG. 14. It is obvious from these figures that by separating/removing the finer particles, of which particle sizes are 0.5 $\mu$m or less, and the lower density particles, of which densities are 2.5 g/cm$^3$ or less, from the reproduced red phosphor powder, the phosphor films of high brightness may be obtained.

Embodiment 9

An example of manufacturing phosphor powder will be explained.

First, 100 g of 5% by mass of Eu co-precipitated yttrium oxide raw material, 50 g of sulfur, and 50 g of sodium carbonate as flux are mixed, the mixture is fired under the conditions of 1100° C.×6 hr, thereby an $Y_2O_2S$: Eu phosphor is synthesized.

After firing, excess $Na_2S$ or the like is thoroughly removed by water wash, followed by drying. The phosphor powder is classified by use of the air classifier. By appropriately selecting the operating conditions of the classifier at this time, the particles, of which particle sizes are 30 $\mu$m or more, as the coarser particle, or the particles, of which particle sizes are 0.5 $\mu$m or less, as the finer particle, are removed.

With the red phosphor powder (Embodiment 9), to which the aforementioned classification is applied, and the red phosphor powder (Comparative Embodiment 6), which is manufactured similarly as Embodiment 9 with the exception that the sieving is applied with a metal mesh of an opening of 70 $\mu$m instead of the classification, according to an ordinary method, dot-type phosphor films are, respectively, coated. The characteristics of the individual phosphor films thus obtained are evaluated.

As a result, according to the phosphor powder from which the coarser particles, of which particle sizes are 30 $\mu$m or more, are removed, it is found that the amount of dot-missing decreases. In addition, by removing the particles, of which particle sizes are 0.5 $\mu$m or less, it is confirmed that the emission brightness of the phosphor film is improved. It is of course that the emission brightness is improved by removing the foreign material that is non-emitting material, or the like. According to these, the phosphor films of high quality may be obtained with reproducibility.

INDUSTRIAL APPLICABILITY

As obvious from the aforementioned embodiments, the positive electrode active material of the present invention for secondary batteries, since the coarser particles and the higher density particles, which deteriorate the battery performance and the manufacturing yield, are removed, largely contributes in improving the manufacturing yield and the battery performance of the nonaqueous electrolytic solution secondary batteries. Furthermore, according to the manufacturing method of the positive electrode active material of the present invention for secondary batteries, the positive electrode active material of high performance may be manufactured less expensively and effectively.

The reproduction method of the electronic functional material of the present invention allows assuredly separating/removing the foreign material, impurities, fine particles, coarse agglomerations and so on that have been difficult to separate by the existing physical reproduction. Accordingly, in addition to sufficiently exhibiting a reduction effect of the treatment cost due to the physical reproduction, the reproduced electronic functional material of high quality may be obtained with reproducibility.

What is claimed is:

1. A positive electrode active material consisting essentially of a metal oxide powder for use in a nonaqueous electrolyte secondary battery, comprising:

1 vol. % or less of a coarse particle having a particle diameter of 600% or more relative to an average particle diameter of the metal oxide powder; and 1000 ppm or less by mass of a high density particle having a density of 150% or more relative to an average density of the metal oxide powder.

2. The positive electrode active material as set forth in claim 1:
wherein the coarse particle is at least one particle selected from an agglomeration of the positive electrode active material, a combination of the positive electrode active material and other material, and a impurity particle, and the high density particle is a powdery metallic impurity.

3. The positive electrode active material as set forth in claim 1:
wherein a content of the coarse particle, of which the particle diameter is 400% or more relative to the average particle diameter of the metal oxide powder, is 1 vol. % or less, and a content of the high density particle, of which the density is 150% or more relative to the average density of the metal oxide powder, is 100 ppm or less by mass.

4. The positive electrode active material as set forth in claim 1, further comprising:
1 vol. % or less of a fine particle having a particle diameter of 15% or less relative to the average particle diameter of the metal oxide powder; and
1000 ppm or less by mass of a low density particle having a density of 50% or less relative to the average density of the metal oxide powder.

5. The positive electrode active material as set forth in claim 1:
wherein the positive electrode active material is made of a composite metal oxide including lithium and at least one element selected from cobalt, nickel and manganese.

6. The positive electrode active material as set forth in claim 5:
wherein amounts of impurity elements in the positive electrode active material are 200 ppm or less for iron, 50 ppm or less for copper, 30 ppm or less for zinc, 400 ppm or less for nickel, and 40 ppm or less for manganese.

7. A nonaqueous electrolyte secondary battery, comprising:
a positive electrode comprising a positive electrode active material consisting essentially of a Li containing composite metal oxide powder, the positive electrode active material comprising 1 vol. % or less of a coarse particle having a particle diameter of 600% or more relative to an average particle diameter of the composite metal oxide powder, and 1000 ppm or less by mass of a high density particle having a density of 150% or more relative to an average density of the composite metal oxide powder;
a negative electrode disposed so as to face the positive electrode through a separator;
a battery case for accommodating the positive electrode, the separator and the negative electrode; and
a nonaqueous electrolyte filled in the battery case.

8. The nonaqueous electrolyte secondary battery as set forth in claim 7:
wherein the secondary battery is used for a portable electronic device.

9. A portable electronic device, comprising:
a nonaqueous electrolyte secondary battery set forth in claim 7 as a power source.

* * * * *